(12) United States Patent
Matas et al.

(10) Patent No.: US 9,239,662 B2
(45) Date of Patent: Jan. 19, 2016

(54) USER INTERFACE EDITOR

(75) Inventors: Michael Matas, San Francisco, CA (US); Kimon Tsinteris, San Francisco, CA (US); Austin Sarner, San Francisco, CA (US); Charles Melcher, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 186 days.

(21) Appl. No.: 13/491,100

(22) Filed: Jun. 7, 2012
(Under 37 CFR 1.47)

(65) Prior Publication Data

US 2013/0339907 A1    Dec. 19, 2013

Related U.S. Application Data

(60) Provisional application No. 61/593,841, filed on Feb. 1, 2012.

(51) Int. Cl.
| | | |
|---|---|---|
| *G06F 3/0481* | (2013.01) | |
| *G06T 15/60* | (2006.01) | |
| *G06T 11/60* | (2006.01) | |
| *G06F 3/0484* | (2013.01) | |
| *G06F 3/01* | (2006.01) | |
| *G06F 3/0485* | (2013.01) | |
| *G06F 17/21* | (2006.01) | |
| *H04L 29/08* | (2006.01) | |

(52) U.S. Cl.
CPC ............ *G06F 3/04815* (2013.01); *G06F 3/017* (2013.01); *G06F 3/0481* (2013.01); *G06F 3/0484* (2013.01); *G06F 3/0485* (2013.01); *G06F 3/04842* (2013.01); *G06F 17/211* (2013.01); *G06T 11/60* (2013.01); *G06T 15/60* (2013.01); *H04L 67/06* (2013.01); *H04L 67/18* (2013.01)

(58) Field of Classification Search
CPC ...... G06F 3/0481; G06F 3/0484; G06T 11/60
USPC .......................................................... 715/853
See application file for complete search history.

(56) References Cited

U.S. PATENT DOCUMENTS

| | | | |
|---|---|---|---|
| 4,730,314 | A | 3/1988 | Noguchi |
| 5,727,129 | A | 3/1998 | Barrett |
| 6,421,071 | B1 | 7/2002 | Harrison |
| 6,847,388 | B2 | 1/2005 | Anderson |
| 6,934,740 | B1 | 8/2005 | Lawande |
| 6,948,125 | B2 | 9/2005 | Detweiler |
| 6,971,957 | B2 | 12/2005 | Osako |
| 7,320,113 | B2 | 1/2008 | Roberts |
| 7,434,245 | B1 | 10/2008 | Shiga |

(Continued)

OTHER PUBLICATIONS

U.S. Appl. No. 13/487,765, filed Jun. 4, 2012, Matas.

(Continued)

*Primary Examiner* — Anil Bhargava
(74) *Attorney, Agent, or Firm* — Baker Botts L.L.P.

(57) ABSTRACT

In one embodiment, a method performed by one or more computing devices including defining a hierarchical structure for a user interface (UI) that includes defining one or more layers of the hierarchical structure, adding one or more objects at each layer, and specifying one or more relationships among particular objects. The method further including associating metadata with each object at each layer, the metadata describing how the corresponding object is presented in the user interface.

20 Claims, 16 Drawing Sheets

(56) References Cited

U.S. PATENT DOCUMENTS

| | | | |
|---|---|---|---|
| 7,439,975 B2 | 10/2008 | Hsu | |
| 7,663,620 B2 | 2/2010 | Robertson | |
| 7,663,623 B2 | 2/2010 | Zhou | |
| 7,664,739 B2 | 2/2010 | Farago | |
| 7,667,719 B2 | 2/2010 | Goodwin | |
| 7,675,518 B1 | 3/2010 | Miller | |
| 7,689,933 B1 | 3/2010 | Parsons | |
| 7,743,322 B2 * | 6/2010 | Atkins | G06T 11/60 715/243 |
| 7,769,794 B2 * | 8/2010 | Moore | G06F 17/30126 707/822 |
| 7,797,641 B2 | 9/2010 | Karukka | |
| 7,817,823 B1 | 10/2010 | O'Donnell | |
| 7,890,889 B2 | 2/2011 | Artman | |
| 7,916,157 B1 | 3/2011 | Kelley | |
| 7,996,788 B2 | 8/2011 | Carmichael | |
| 8,006,195 B1 | 8/2011 | Woodings | |
| 8,082,522 B2 | 12/2011 | Kinouchi | |
| 8,131,898 B2 | 3/2012 | Shah | |
| 8,140,404 B1 | 3/2012 | Scott | |
| 8,341,543 B2 | 12/2012 | Shah | |
| 8,365,091 B2 | 1/2013 | Young | |
| 8,416,198 B2 | 4/2013 | Rathnam | |
| 8,423,889 B1 | 4/2013 | Zagorie | |
| 8,438,504 B2 | 5/2013 | Cranfill | |
| 8,458,614 B1 * | 6/2013 | Smith | G06F 3/0481 715/794 |
| 8,473,868 B1 | 6/2013 | Kauffman | |
| 8,516,385 B1 * | 8/2013 | Eismann | G06F 8/34 715/762 |
| 8,533,190 B2 | 9/2013 | Walker | |
| 8,539,344 B2 | 9/2013 | Hull | |
| 8,539,384 B2 | 9/2013 | Hinckley | |
| 8,549,442 B2 | 10/2013 | Marks | |
| 8,584,027 B2 | 11/2013 | Quennesson | |
| 8,635,531 B2 | 1/2014 | Graham | |
| 8,639,694 B1 | 1/2014 | Wolfe | |
| 8,656,312 B2 | 2/2014 | Kagaya | |
| 8,669,950 B2 | 3/2014 | Forstall | |
| 8,683,378 B2 | 3/2014 | Bull | |
| 8,736,561 B2 | 5/2014 | Anzures | |
| 8,799,658 B1 | 8/2014 | Seller | |
| 8,806,371 B2 | 8/2014 | Louch | |
| 8,856,678 B1 | 10/2014 | Cho | |
| 8,856,684 B2 | 10/2014 | Duhig | |
| 8,904,304 B2 | 12/2014 | Farago | |
| 8,930,992 B2 | 1/2015 | Sugiyama | |
| 8,976,199 B2 | 3/2015 | Matas | |
| 8,977,980 B2 | 3/2015 | Abe | |
| 8,984,428 B2 | 3/2015 | Matas | |
| 8,990,691 B2 | 3/2015 | Matas | |
| 8,990,719 B2 | 3/2015 | Matas | |
| 8,997,151 B2 | 3/2015 | Chai | |
| 9,003,305 B2 | 4/2015 | Matas | |
| 9,007,371 B2 | 4/2015 | Matas | |
| 9,009,626 B2 | 4/2015 | Tsuk | |
| 9,098,168 B2 | 8/2015 | Matas | |
| 2001/0030667 A1 | 10/2001 | Kelts | |
| 2001/0033303 A1 | 10/2001 | Anderson | |
| 2002/0029232 A1 * | 3/2002 | Bobrow | G06F 17/30011 514/534 |
| 2002/0070982 A1 | 6/2002 | Hill | |
| 2002/0107892 A1 | 8/2002 | Chittu | |
| 2003/0001907 A1 | 1/2003 | Bergsten | |
| 2003/0046401 A1 | 3/2003 | Abbott | |
| 2003/0051214 A1 | 3/2003 | Graham | |
| 2003/0090504 A1 | 5/2003 | Brook | |
| 2003/0236917 A1 | 12/2003 | Gibbs | |
| 2004/0001106 A1 | 1/2004 | Deutscher | |
| 2004/0095376 A1 | 5/2004 | Graham | |
| 2004/0145603 A1 | 7/2004 | Soares | |
| 2005/0005246 A1 | 1/2005 | Card | |
| 2005/0010955 A1 | 1/2005 | Elia | |
| 2005/0055426 A1 | 3/2005 | Smith | |
| 2005/0071783 A1 * | 3/2005 | Atkins | G06T 11/60 715/851 |
| 2005/0177798 A1 | 8/2005 | Thomson | |
| 2005/0210403 A1 | 9/2005 | Satanek | |
| 2005/0262149 A1 | 11/2005 | Jung | |
| 2006/0017735 A1 | 1/2006 | Rabb | |
| 2006/0036625 A1 | 2/2006 | Judd | |
| 2006/0056334 A1 | 3/2006 | Yuan | |
| 2006/0059425 A1 | 3/2006 | Anspach | |
| 2006/0150091 A1 * | 7/2006 | Suzuki | G06T 11/60 715/253 |
| 2006/0174209 A1 | 8/2006 | Barros | |
| 2006/0230354 A1 | 10/2006 | Jennings | |
| 2006/0236251 A1 | 10/2006 | Kataoka | |
| 2006/0253777 A1 | 11/2006 | Yalovsky | |
| 2007/0073719 A1 | 3/2007 | Ramer | |
| 2007/0088681 A1 | 4/2007 | Aravamudan | |
| 2007/0115300 A1 | 5/2007 | Barney | |
| 2007/0150826 A1 | 6/2007 | Anzures | |
| 2007/0198950 A1 | 8/2007 | Dodge | |
| 2007/0226640 A1 | 9/2007 | Holbrook | |
| 2007/0258642 A1 | 11/2007 | Thota | |
| 2007/0271516 A1 | 11/2007 | Carmichael | |
| 2007/0281733 A1 | 12/2007 | Griffin | |
| 2008/0022229 A1 | 1/2008 | Bhumkar | |
| 2008/0025529 A1 | 1/2008 | Keohane | |
| 2008/0052636 A1 | 2/2008 | Abe | |
| 2008/0052742 A1 | 2/2008 | Kopf | |
| 2008/0065675 A1 * | 3/2008 | Bozich | G06F 17/30011 |
| 2008/0079972 A1 | 4/2008 | Goodwin | |
| 2008/0082927 A1 | 4/2008 | Kelts | |
| 2008/0098330 A1 | 4/2008 | Tsuk | |
| 2008/0155458 A1 | 6/2008 | Fagans | |
| 2008/0168404 A1 | 7/2008 | Ording | |
| 2008/0174570 A1 | 7/2008 | Jobs | |
| 2008/0222540 A1 | 9/2008 | Schulz | |
| 2008/0276273 A1 | 11/2008 | Billmaier | |
| 2009/0007017 A1 | 1/2009 | Anzures | |
| 2009/0007188 A1 | 1/2009 | Omernick | |
| 2009/0061837 A1 | 3/2009 | Chaudhri | |
| 2009/0070710 A1 | 3/2009 | Kagaya | |
| 2009/0100373 A1 | 4/2009 | Pixley | |
| 2009/0132921 A1 | 5/2009 | Hwangbo | |
| 2009/0172532 A1 | 7/2009 | Chaudhri | |
| 2009/0172543 A1 | 7/2009 | Cronin | |
| 2009/0199091 A1 | 8/2009 | Covington | |
| 2009/0201270 A1 | 8/2009 | Pikkujamsa | |
| 2009/0204928 A1 | 8/2009 | Kallio | |
| 2009/0228782 A1 | 9/2009 | Fraser | |
| 2009/0228832 A1 | 9/2009 | Cheng | |
| 2009/0249239 A1 | 10/2009 | Eilers | |
| 2009/0271703 A1 | 10/2009 | Chu | |
| 2009/0288032 A1 | 11/2009 | Chang | |
| 2009/0300548 A1 | 12/2009 | Sullivan | |
| 2009/0309846 A1 | 12/2009 | Trachtenberg | |
| 2010/0060666 A1 | 3/2010 | Fong | |
| 2010/0097338 A1 | 4/2010 | Miyashita | |
| 2010/0114991 A1 | 5/2010 | Chaudhary | |
| 2010/0119180 A1 | 5/2010 | Wiedemann et al. | |
| 2010/0122195 A1 | 5/2010 | Hwang | |
| 2010/0122214 A1 | 5/2010 | Sengoku | |
| 2010/0174993 A1 | 7/2010 | Pennington | |
| 2010/0277496 A1 | 11/2010 | Kawanishi | |
| 2010/0287494 A1 | 11/2010 | Ording | |
| 2010/0313125 A1 | 12/2010 | Fleizach | |
| 2011/0035703 A1 | 2/2011 | Negishi | |
| 2011/0063248 A1 | 3/2011 | Yoon | |
| 2011/0074699 A1 | 3/2011 | Man | |
| 2011/0122078 A1 | 5/2011 | Kasahara | |
| 2011/0122159 A1 | 5/2011 | Bergsten | |
| 2011/0157051 A1 | 6/2011 | Shohga | |
| 2011/0161818 A1 | 6/2011 | Viljamaa | |
| 2011/0163969 A1 | 7/2011 | Anzures | |
| 2011/0163971 A1 | 7/2011 | Wagner | |
| 2011/0167380 A1 | 7/2011 | Stallings | |
| 2011/0185314 A1 | 7/2011 | Sahai | |
| 2011/0187655 A1 | 8/2011 | Min | |
| 2011/0202834 A1 | 8/2011 | Mandryk | |
| 2011/0209100 A1 | 8/2011 | Hinckley | |
| 2011/0234615 A1 * | 9/2011 | Hanson | G06F 9/4443 |

(56) References Cited

U.S. PATENT DOCUMENTS

| | | | |
|---|---|---|---|
| 2011/0246614 A1 | 10/2011 | Votaw | 345/589 |
| 2011/0276863 A1 | 11/2011 | Bhise | |
| 2011/0296344 A1 | 12/2011 | Habib | |
| 2011/0302532 A1 | 12/2011 | Missig | |
| 2012/0005623 A1 | 1/2012 | Ishak | |
| 2012/0026611 A1 | 2/2012 | Hu et al. | |
| 2012/0047432 A1 | 2/2012 | Yalovsky | |
| 2012/0054684 A1 | 3/2012 | Gossweiler | |
| 2012/0070017 A1 | 3/2012 | Dorogusker | |
| 2012/0084662 A1 | 4/2012 | Navarro | |
| 2012/0105489 A1 | 5/2012 | Monroe | |
| 2012/0131516 A1 | 5/2012 | Chiu | |
| 2012/0148088 A1* | 6/2012 | Mital | G06T 11/60 382/100 |
| 2012/0159381 A1 | 6/2012 | Tseng | |
| 2012/0159393 A1 | 6/2012 | Sethi | |
| 2012/0192101 A1 | 7/2012 | Migos | |
| 2012/0192118 A1 | 7/2012 | Migos | |
| 2012/0227002 A1 | 9/2012 | Tiwari | |
| 2012/0233565 A1 | 9/2012 | Grant | |
| 2012/0233573 A1 | 9/2012 | Sullivan | |
| 2012/0266068 A1 | 10/2012 | Ryman | |
| 2012/0266104 A1 | 10/2012 | Shah | |
| 2012/0266130 A1 | 10/2012 | Kinnucan | |
| 2012/0272171 A1 | 10/2012 | Icho | |
| 2012/0272181 A1 | 10/2012 | Rogers | |
| 2012/0311438 A1 | 12/2012 | Cranfill | |
| 2012/0327009 A1 | 12/2012 | Fleizach | |
| 2013/0019263 A1 | 1/2013 | Ferren | |
| 2013/0067510 A1 | 3/2013 | Ahanger | |
| 2013/0073932 A1 | 3/2013 | Migos | |
| 2013/0104017 A1 | 4/2013 | Ko | |
| 2013/0135309 A1 | 5/2013 | King | |
| 2013/0183943 A1 | 7/2013 | Tow | |
| 2013/0194269 A1 | 8/2013 | Matas | |
| 2013/0194307 A1 | 8/2013 | Matas | |
| 2013/0198261 A1 | 8/2013 | Matas | |
| 2013/0198631 A1 | 8/2013 | Matas | |
| 2013/0198634 A1 | 8/2013 | Matas | |
| 2013/0198661 A1 | 8/2013 | Matas | |
| 2013/0198663 A1 | 8/2013 | Matas | |
| 2013/0198664 A1 | 8/2013 | Matas | |
| 2013/0198665 A1 | 8/2013 | Matas | |
| 2013/0198666 A1 | 8/2013 | Matas | |
| 2013/0198668 A1 | 8/2013 | Matas | |
| 2013/0198681 A1 | 8/2013 | Matas | |
| 2013/0198682 A1 | 8/2013 | Matas | |
| 2013/0198683 A1 | 8/2013 | Matas | |
| 2013/0205210 A1 | 8/2013 | Jeon | |
| 2013/0227494 A1 | 8/2013 | Matas | |
| 2013/0307792 A1 | 11/2013 | Andres | |
| 2013/0314341 A1 | 11/2013 | Lee | |
| 2013/0346906 A1 | 12/2013 | Farago | |
| 2014/0013283 A1 | 1/2014 | Matas | |
| 2014/0033124 A1* | 1/2014 | Sorrick | G06F 3/048 715/810 |
| 2014/0046809 A1 | 2/2014 | Baker | |
| 2014/0164985 A1 | 6/2014 | Pimmel | |
| 2014/0250358 A1 | 9/2014 | Milener | |
| 2014/0258849 A1 | 9/2014 | Chung | |
| 2014/0282262 A1 | 9/2014 | Gregotski | |
| 2014/0282263 A1 | 9/2014 | Pennington | |
| 2014/0288686 A1 | 9/2014 | Sant | |
| 2015/0026825 A1 | 1/2015 | Dube | |
| 2015/0095839 A1 | 4/2015 | Hombert | |
| 2015/0100880 A1 | 4/2015 | Matas | |
| 2015/0100924 A1 | 4/2015 | Matas | |

OTHER PUBLICATIONS

U.S. Appl. No. 13/487,805, filed Jun. 4, 2012, Matas.
U.S. Appl. No. 13/555,607, filed Jul. 23, 2012, Matas.
U.S. Appl. No. 13/555,657, filed Jul. 23, 2012, Matas.
U.S. Appl. No. 13/555,845, filed Jul. 23, 2012, Matas.
U.S. Appl. No. 13/488,039, filed Jun. 4, 2012, Matas.
U.S. Appl. No. 13/555,876, filed Jul. 23, 2012, Matas.
U.S. Appl. No. 13/490,343, filed Jun. 6, 2012, Matas.
U.S. Appl. No. 13/488,076, filed Jun. 4, 2012, Matas.
U.S. Appl. No. 13/555,909, filed Jul. 23, 2012, Matas.
U.S. Appl. No. 13/490,367, filed Jun. 6, 2012, Matas.
U.S. Appl. No. 13/490,736, filed Jun. 7, 2012, Matas.
U.S. Appl. No. 13/489,172, filed Jun. 5, 2012, Matas.
U.S. Appl. No. 13/489,265, filed Jun. 5, 2012, Matas.
U.S. Appl. No. 14/569,475, filed Dec. 12, 2014, Matas.
U.S. Appl. No. 14/572,405, filed Dec. 16, 2014, Matas.
Response to Final Office Action for U.S. Appl. No. 13/487,765, Dec. 29, 2014.
Final Office Action for U.S. Appl. No. 13/487,765, Oct. 3, 2014.
Response to Non-Final Office Action for U.S. Appl. No. 13/487,765, Aug. 13, 2014.
Non-Final Office Action for U.S. Appl. No. 13/487,765, Mar. 14, 2014.
Response to Final Office Action for U.S. Appl. No. 13/487,805, Dec. 29, 2014.
Final Office Action for U.S. Appl. No. 13/487,805, Sep. 26, 2014.
Response to Non-Final Office Action for U.S. Appl. No. 13/487,805, Jul. 31, 2014.
Non-Final Office Action for U.S. Appl. No. 13/487,805, Apr. 3, 2014.
Final Office Action for U.S. Appl. No. 13/555,607, Dec. 3, 2014.
Response to Non-Final Office Action for U.S. Appl. No. 13/555,607, Nov. 4, 2014.
Non-Final Office Action for U.S. Appl. No. 13/555,607, Aug. 20, 2014.
Amendment under Rule 312 for U.S. Appl. No. 13/555,657, Dec. 30, 2014.
Notice of Allowance for U.S. Appl. No. 13/555,657, Dec. 5, 2014.
Response to Non-Final Office Action for U.S. Appl. No. 13/555,657, Nov. 19, 2014.
Non-Final Office Action for U.S. Appl. No. 13/555,657, Sep. 18, 2014.
Response to Non-Final Office Action for U.S. Appl. No. 13/555,845, Oct. 24, 2014.
Non-Final Office Action for U.S. Appl. No. 13/555,845, Apr. 24, 2014.
Final Office Action for U.S. Appl. No. 13/488,039, Dec. 12, 2014.
Response to Non-Final Office Action for U.S. Appl. No. 13/488,039, Nov. 7, 2014.
Non-Final Office Action for U.S. Appl. No. 13/488,039, Jun. 11, 2014.
Final Office Action for U.S. Appl. No. 13/555,876, Nov. 20, 2014.
Response to Non-Final Office Action for U.S. Appl. No. 13/555,876, Oct. 23, 2014.
Non-Final Office Action for U.S. Appl. No. 13/555,876, Jul. 14, 2014.
Response to Final Office Action for U.S. Appl. No. 13/490,343, Dec. 19, 2014.
Final Office Action for U.S. Appl. No. 13/490,343, Nov. 7, 2014.
Response to Non-Final Office Action for U.S. Appl. No. 13/490,343, Oct. 22, 2014.
Non-Final Office Action for U.S. Appl. No. 13/490,343, Jun. 4, 2014.
Response to Final Office Action for U.S. Appl. No. 13/488,076, Dec. 29, 2014.
Final Office Action for U.S. Appl. No. 13/488,076, Oct. 3, 2014.
Response to Non-Final Office Action for U.S. Appl. No. 13/488,076, Jul. 31, 2014.
Non-Final Office Action for U.S. Appl. No. 13/488,076, Apr. 1, 2014.
Non-Final Office Action for U.S. Appl. No. 13/555,909, Nov. 14, 2014.
Response to Final Office Action for U.S. Appl. No. 13/555,909, Aug. 8, 2014.
Final Office Action for U.S. Appl. No. 13/555,909, Apr. 28, 2014.
Response to Non-Final Office Action for U.S. Appl. No. 13/555,909, Mar. 27, 2014.
Non-Final Office Action for U.S. Appl. No. 13/555,909, Jan. 2, 2014.
Non-Final Office Action for U.S. Appl. No. 13/490,367, Nov. 20, 2014.

(56) References Cited

OTHER PUBLICATIONS

Response to Final Office Action for U.S. Appl. No. 13/490,367, Sep. 19, 2014.
Final Office Action for U.S. Appl. No. 13/490,367, May 1, 2014.
Response to Non-Final Office Action for U.S. Appl. No. 13/490,367, Apr. 4, 2014.
Non-Final Office Action for U.S. Appl. No. 13/490,367, Jan. 3, 2014.
Notice of Allowance for U.S. Appl. No. 13/490,736, Nov. 21, 2014.
Response to Non-Final Office Action for U.S. Appl. No. 13/490,736, Oct. 23, 2014.
Non-Final Office Action for U.S. Appl. No. 13/490,736, Jul. 8, 2014.
Final Office Action for U.S. Appl. No. 13/489,172, Dec. 12, 2014.
Response to Non-Final Office Action for U.S. Appl. No. 13/489,172, Aug. 12, 2014.
Non-Final Office Action for U.S. Appl. No. 13/489,172, Mar. 28, 2014.
Notice of Allowance for U.S. Appl. No. 13/489,265, Nov. 7, 2014.
Response to Non-Final Office Action for U.S. Appl. No. 13/489,265, Oct. 28, 2014.
Non-Final Office Action for U.S. Appl. No. 13/489,265, May 2, 2014.
Response to Non-Final Office Action for U.S. Appl. No. 13/677,132, Jan. 5, 2015.
Non-Final Office Action for U.S. Appl. No. 13/677,132, Oct. 3, 2014.
Non-Final Office Action for U.S. Appl. No. 13/677,093, Nov. 21, 2014.
Final Office Action for U.S. Appl. No. 13/487,765, Jan. 14, 2015.
Final Office Action for U.S. Appl. No. 13/487,805, Jun. 1, 2015.
Response to Non-Final Office Action for U.S. Appl. No. 13/487,805, May 18, 2015.
Non-Final Office Action for U.S. Appl. No. 13/487,805, Jan. 16, 2015.
Notice of Allowance for U.S. Appl. No. 13/555,607, Mar. 4, 2015.
Response to Final Office Action for U.S. Appl. No. 13/555,607, Feb. 12, 2015.
Notice of Allowance for U.S. Appl. No. 13/555,657, Feb. 11, 2015.
Notice of Allowance for U.S. Appl. No. 13/555,845, Jan. 30, 2015.
Notice of Allowance for U.S. Appl. No. 13/555,845, Dec. 19, 2014.
Non-Final Office Action for U.S. Appl. No. 13/488,039, Apr. 24, 2015.
Response to Final Office Action for U.S. Appl. No. 13/488,039, Mar. 17, 2015.
Non-Final Office Action for U.S. Appl. No. 13/555,876, Apr. 30, 2015.
Response to Final Office Action for U.S. Appl. No. 13/555,876, Mar. 23, 2015.
Notice of Allowance for U.S. Appl. No. 13/490,343, Jan. 29, 2015.
Notice of Allowance for U.S. Appl. No. 13/490,343, Jan. 14, 2015.
Non-Final Office Action for U.S. Appl. No. 13/488,076, Jan. 15, 2015.
Response to Non-Final Office Action for U.S. Appl. No. 13/555,909, Mar. 4, 2015.
Final Office Action for U.S. Appl. No. 13/490,367, May 21, 2015.
Response to Non-Final Office Action for U.S. Appl. No. 13/490,367, Mar. 19, 2015.
Notice of Allowance for U.S. Appl. No. 13/490,736, Feb. 25, 2015.
Response to Final Office Action for U.S. Appl. No. 13/489,172, Feb. 12, 2015.
Notice of Allowance for U.S. Appl. No. 13/489,265, Jan. 30, 2015.
Final Office Action for U.S. Appl. No. 13/677,093, May 28, 2015.
Response to Non-Final Office Action for U.S. Appl. No. 13/677,093, Mar. 19, 2015.
Final Office Action for U.S. Appl. No. 13/677,132, Apr. 7, 2015.
Borst, C. et al., "A Spring Model for Whole-Hand Virtual Grasping," Presence, vol. 15, No. 1, pp. 47, 61, Feb. 2006, doi: 10.1162/pres. 2006.15.1.47, http://ieeexplore.ieee.org/stamp/stamp.jsp?tp=&arnumber=6797721&isnumber=6797198, Jun. 3, 2015.
Notice of Allowance for U.S. Appl. No. 13/487,765, Sep. 15, 2015.
Response to Final Office Action for U.S. Appl. No. 13/487,765, Jul. 14, 2015.
Response to Final Office Action for U.S. Appl. No. 13/487,805, Nov. 2, 2015.
Notice of Allowance for U.S. Appl. No. 13/488,039, Sep. 10, 2015.
Response to Non-Final Office Action for U.S. Appl. No. 13/488,039, Aug. 7, 2015.
Final Office Action for U.S. Appl. No. 13/555,876, Sep. 10, 2015.
Response to Final Office Action for U.S. Appl. No. 13/555,876, Aug. 5, 2015.
Notice of Allowance for U.S. Appl. No. 13/488,076, Aug. 31, 2015.
Response to Non-Final Office Action for U.S. Appl. No. 13/488,076, Jul. 15, 2015.
Notice of Allowance for U.S. Appl. No. 13/555,909, Jun. 24, 2015.
Notice of Allowance for U.S. Appl. No. 13/555,909, Jun. 3, 2015.
Response to Final Office Action for U.S. Appl. No. 13/490,367, Oct. 20, 2015.
Non-Final Office Action for U.S. Appl. No. 13/677,093, Oct. 5, 2015.
Response to Final Office Action for U.S. Appl. No. 13/677,093, Aug. 13, 2015.
Final Office Action for U.S. Appl. No. 13/677,132, Sep. 28, 2015.
Response to Final Office Action for U.S. Appl. No. 13/677,132, Jun. 24, 2015.
Non-Final Office Action for U.S. Appl. No. 13/489,172, Oct. 7, 2015.

* cited by examiner

Figure 10      1010

USER INTERFACE EDITOR

RELATED APPLICATION

This application claims the benefit, under 35 U.S.C. §119 (e), of U.S. Provisional Patent Application No. 61/593,841, filed 1 Feb. 2012, which is incorporated herein by reference.

TECHNICAL FIELD

This disclosure generally relates to designing and editing a user interface having its components or elements organized in a hierarchical structure.

BACKGROUND

A user interface (UI), in the industrial design field of human-machine interaction, is the space where interactions between humans and machines occur. The goal of interactions between a human, often referred to as a "user", and a machine at the user interface is user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

In addition to stationary devices (e.g., desktop computers), mobile devices (e.g., mobile telephones or tablet computers) are increasingly able to access various sources (e.g., sources on the Internet) to download data representing user-consumable content, such as games, audio, video, images, executables, books, and so on. Users can personalize content on their mobile as well as stationary devices with user interface customization capabilities.

DESCRIPTION OF EXAMPLE EMBODIMENTS

In particular embodiments, components of a user interface (UI) may be organized into a hierarchy. In particular embodiments, a UI component may represent an object, such as a piece of user-consumable content, which may be presented to a user on an electronic device for consumption. Consequently, objects (e.g., pieces of user-consumable content) may be presented to a user in a user interface according to a hierarchical structure.

In particular embodiments, components of a user interface may be organized into a hierarchy based on how the individual objects represented by the corresponding UI components are related to each other. The hierarchy may have any number of levels, and at each level, there may be any number of UI components representing specific objects. Parent-child or sibling relationships may exist between specific UI components representing specific objects in the hierarchy. Within the hierarchy, a parent object is one level above the level of its child objects. Two sibling objects are at the same level and share the same parent object. In addition, any portion of the hierarchy may also be considered a hierarchy in itself.

In particular embodiments, a UI editor may be provided to enable a person (e.g., a UI designer or developer) to design and create a user interface (e.g., defining the hierarchical structure of the user interface, selecting and laying out the individual UI components, stipulating the operations associated with or behaviors of the individual UI components, etc.).

Figure 1:
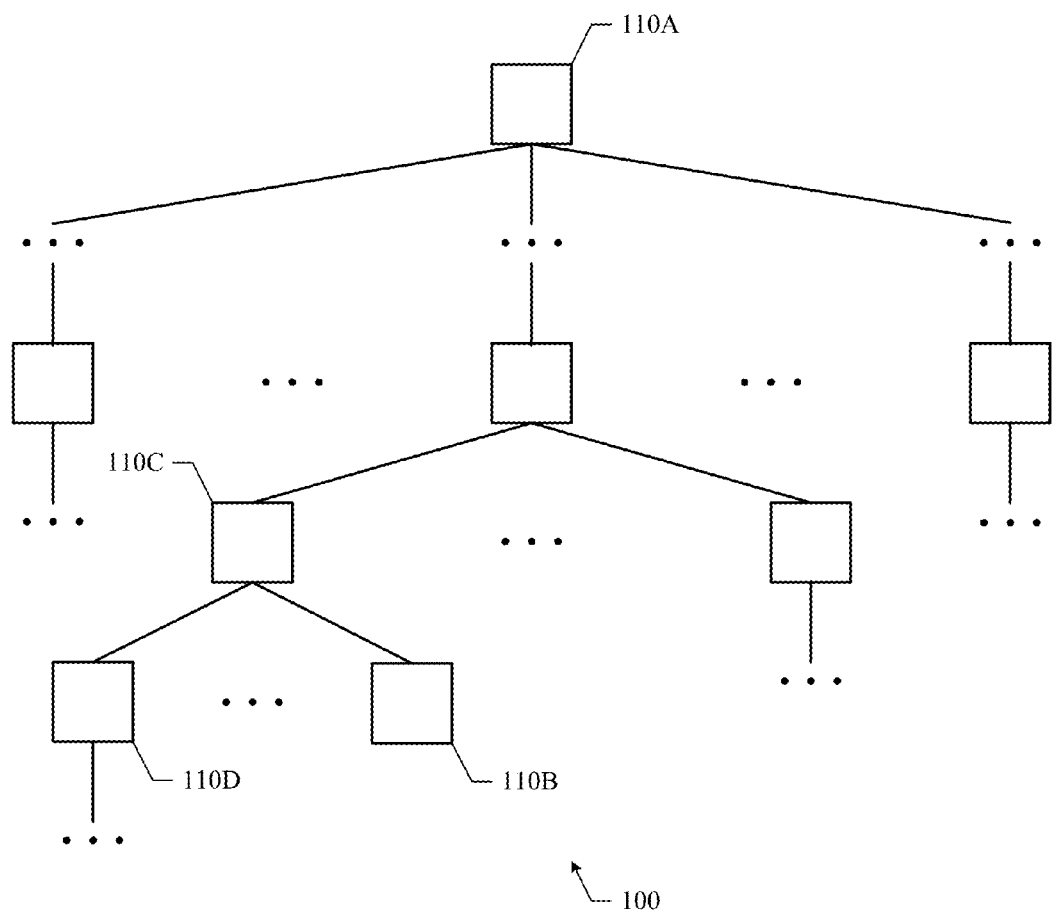
FIG. 1 illustrates an example hierarchical structure of a user interface.

As an example, FIG. 1 illustrates a portion of an object hierarchy 100 that includes a number of objects 110. In particular embodiments, an object in a hierarchy may or may not have a parent. If an object does not have a parent, it may be referred to as a "root" object (e.g., object 110A). In particular embodiments, an object in a hierarchy may or may not have any children. If an object does not have any children, it may be referred to as a "leaf" object (e.g., object 110B). If an object does have children (e.g., object 110C), it may have any number of children. In addition, objects sharing the same parent may be referred to as each other's "siblings". For example, in FIG. 1, object 110C is the parent of objects 110D and 110B. Objects 110D and 110B are the children of object 110C and are siblings to each other. Thus, a hierarchy of objects (e.g., object hierarchy 100) not only includes the individual objects themselves but also indicates the relationships among the specific objects. Moreover, the position of a specific object within the hierarchy may be used to indicate its relationships with other objects in the hierarchy.

Objects may be of any applicable types. In particular embodiments, an object may correspond to a piece of user-consumable content. In particular embodiments, an object may be consumed by a user if the user may, for example and without limitation, interact with, view, read, listen to, manipulate, or handle the object. For example and without limitation, some user-consumable objects may be text blocks, images, videos, audios, feeds, executables (e.g., application programs or games), websites, web pages, digital books, photo albums, posts, or messages. In particular embodiments, user-consumable content, or more specifically, user-consumable objects, may be organized into a hierarchy based on, for example, the relationships among the individual pieces of user-consumable content or objects. Consequently, a hierarchy of user-consumable content may be represented as a hierarchy of objects, where individual objects in the hierarchy may correspond to specific pieces of user-consumable content (e.g., texts, images, videos, audios, executables, etc.). In addition, the structure of the hierarchy indicates the relationships among the specific objects.

In some cases, the relationships among the objects (e.g., pieces of user-consumable content) may correspond to how the objects are organized and presented to a user. In particular embodiments, when presenting a hierarchy of objects to a user of a device, the objects may be organized and presented according to the structure of the hierarchy. The objects may be presented in a UI provided on the device. The objects may be organized and presented in the UI according to the structure of the hierarchy so that the UI itself becomes hierarchical as well, with each UI component corresponding to or representing a specific object. Consequently, the UI may include a number of layers, respectively corresponding to the levels in the hierarchy. The positions of the objects within the hierarchy are preserved in the UI, such that a specific object at a specific position in the hierarchy is presented in the corresponding position in the UI. The relationships among the objects within the hierarchy are maintained in the UI.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or any graphical user interface (GUI) or content or media elements on each page. Each of these also corresponds to an object in the hierarchy. More specifically, when these objects are organized in a hierarchy, the book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or any GUI or content or media elements on that page. A text block, image, video, audio, or GUI or content or media element is one of the child objects of the page to which it belongs. Similarly, for a software application that manages news feeds, its components may include the individual news channels and the news stories within each channel. Each of these may correspond to an object. When these objects are arranged in a hierarchy, the news-feed application, while itself being one of the child objects of the desktop, is also the parent object of the news channels. A news channel in turn is the parent object of the news stories included in that channel.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy.

As a third example, a website, such as a social-networking website, may also be arranged in such a hierarchical structure for navigating the content of the social-networking website. In this context, the social-networking website may be a parent object whose child objects are the components (e.g., photo albums, user profile pages, etc.) of the website. For example, a photo album, while itself being a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, etc. In particular embodiments, child objects in the hierarchy may also include applications the user has added to the profile page, such as a Spotify music sharing application. Moreover, individual stories, songs the user has listened to, and playlists may be child objects at a lower hierarchical level. In particular embodiments, child objects in the hierarchy may include particular sections of a user's profile, such as the user's education and employment information, or the public "wall" of the user's profile page. This disclosure contemplates representing and addressing any collection of content in a hierarchical object or nodal structure.

As these examples illustrate, an object may be of any type and this disclosure contemplates any applicable types of objects. For example and without limitation, the term "object" may refer to any type of content, including but not limited to images, videos, captions, text blocks or boxes, user interface elements, URLs, newsfeed stories, references to other objects, advertisements, calendar events, units for displaying open graph analysis that may be graphically rendered, applications, websites, web pages, books, chapters. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface (UI) or how the objects are presented to a user.

In particular embodiments, a UI editor enables a person (e.g., a UI designer or developer) to create or edit a user interface. In particular embodiments, the user interface may include UI components corresponding to user-consumable content (e.g., books, news, images, videos, messages, user profiles, timelines, photo albums, status updates, emails, or any combination of media and GUI elements, etc.), and may be used for presenting such content on an electronic device. Such a UI editor may enable a UI designer to quickly and easily design a user interface for presenting interactive content, such as digital books, in an intuitive fashion. Further, the UI editor allows a UI designer to quickly create an interface or format to easily navigate selected content.

In particular embodiments, using the UI editor, a UI designer may define a hierarchical structure (e.g., hierarchy 100) for a user interface. The hierarchical structure may include any number of layers corresponding to the layers of the user interface. Using the UI editor, the UI designer may place a number of objects, corresponding to specific UI components, at each layer. In addition, the UI designer may specify relationships (e.g., parent-child, sibling) among the specific objects at various layers. In particular embodiments, metadata may be associated with each object in the hierarchy. The metadata may describe how the corresponding object should be presented (e.g., its layout, style, format, visual appearance or embellishment, etc.) in the user interface. An object's metadata may be attached to the object itself. Thus, if an object is moved from one position in the hierarchy to another position, the object's metadata moves with it, which means all of the information describing how the object should be presented moves with the object.

There are several advantages with associating metadata with individual objects and using metadata to describe how the corresponding objects should be presented. As an example, often, when designing a user interface, the designer may wish to try several versions before settling on a final version. As such, the designer may move UI components to different positions, rearrange UI components, or try different layouts or formats or visual appearances for individual UI components. Since each UI component corresponds to an object and each object has its own associated metadata, as the designer tries out each different version of the user interface, the designer may see how that version appears when presented on a device, as the new appearances of the objects may be generated (e.g., by the UI editor) based on their associated metadata. As another example, if the designer wishes to modify how an object should be presented (e.g., the object's appearance), the UI editor only needs to modify the metadata associated with that object to reflect the changes made by the designer. As a third example, the metadata associated with an object may support multiple appearances of that object suitable for different circumstances. For example, an image may sometimes be presented in full-screen or full-page format and sometimes be presented in in-line-text format (e.g., with text flowing around the image). Using the metadata associated the image, the image may be presented in different formats under different circumstances, depending on which format is more suitable for specific circumstances. As these examples illustrate, associating metadata with an object where the metadata describes how the object should be presented in a user interface provides flexibility in UI design and presentation.

In particular embodiments, the UI editor may enable the designer not only to design a user interface as a whole (e.g., hierarchical structure and the specific objects within the user interface) but also enables the designer to adjust the visual appearance, behavior, or functionality of each individual object as well. In addition, the UI editor may enable the designer to specify how a group of related objects should be presented together. For example, a parent object may have a number of child objects. The UI editor may enable the designer to specify how the parent object and its child objects should be presented together (e.g., their layout, format), how they should behave, how should the child objects be anchored to their parent object, and so on.

Figure 2:
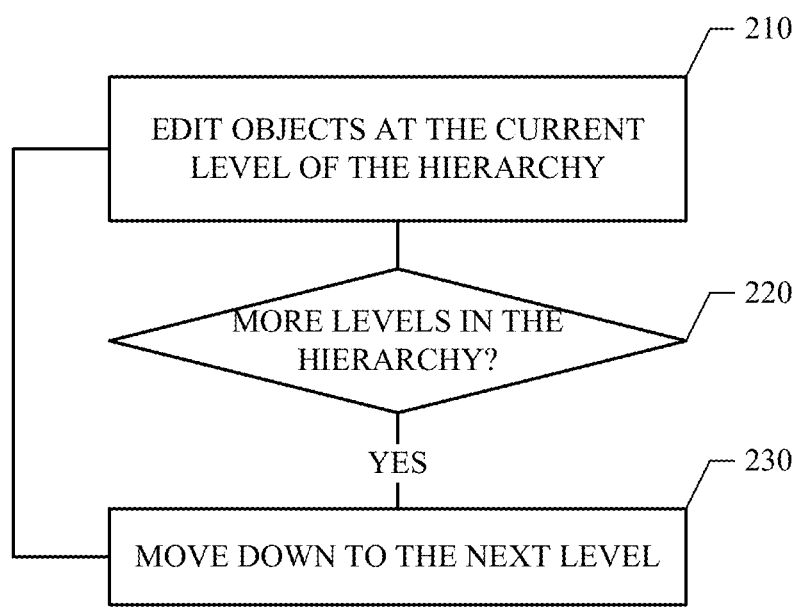
FIG. 2 illustrates an example method for iteratively editing a hierarchical structure of a user interface.

In particular embodiments, for a user interface where the UI components, corresponding to specific objects, are arranged in a hierarchy, the objects and their corresponding UI components may be edited one level at a time, as illustrated in FIG. 2. The hierarchy of UI components may be edited iteratively, one level at a time. During each iteration, a UI designer may design interactive content (e.g., represented as specific objects corresponding to specific UI components) at the current level of the hierarchy using the UI editor (STEP 210). Then, if there are more levels for which the designer wants to design interactive content using the UI editor (STEP 220, "YES"), the designer may proceeds down to the next level (STEP 230) and another iteration of design is repeated, until all objects at all levels have been designed according to the specifications of the user interface.

As an example, a hierarchy of objects that a UI designer wants to design may be a representation of a book. The book that the designer wants to design may include any number of sections (e.g., chapters); each section may include any number of pages; and each page may include any number of texts, images, videos, etc. Based on the method illustrated in FIG. 3, the book hierarchy may be designed and edited one level at a time. First, the data representing the book (e.g., the book's title, cover page, author, publication information, and table of content (TOC)) may be designed and edited, followed by the data representing the individual sections (e.g., each section's title, summary, background page, and page index), followed by the data representing the pages of the sections, followed by the data representing the content (e.g., texts, images, videos, audios, etc.) of the pages. During each iteration of designing and editing, data representing the current object at the current level of the hierarchy is designed, edited, previewed, and published.

In particular embodiments, during a specific iteration, a UI designer may select a layout for a current object (STEP 310), adds content to the selected layout by selecting and arranging child objects of the current object according to the layout (STEP 320), and edits the individual child objects by, for example, associating metadata with each child object (STEP 330). Then, the designer can preview the design and layout of the current object (STEP 340). Then, if the current object is ready to publish (STEP 350, "YES"), data representing those child objects are published (STEP 360). The child objects are presented according to the selected layout and the metadata associated with each child object. If the current object is not ready to publish (STEP 350, "NO"), the designer can continue adding content (STEP 320) and editing content (STEP 330), and repeat the steps again. Once the book is published, the designer will be able to view and browse the entire structure of the book, the TOC of the book, and the thumbnail versions of the pages. While the designer is browsing the book on a superficial level, objects at lower levels of the hierarchy (e.g., the sections and pages) are available when the designer is ready to dive into specific sections of the book.

Figure 3:
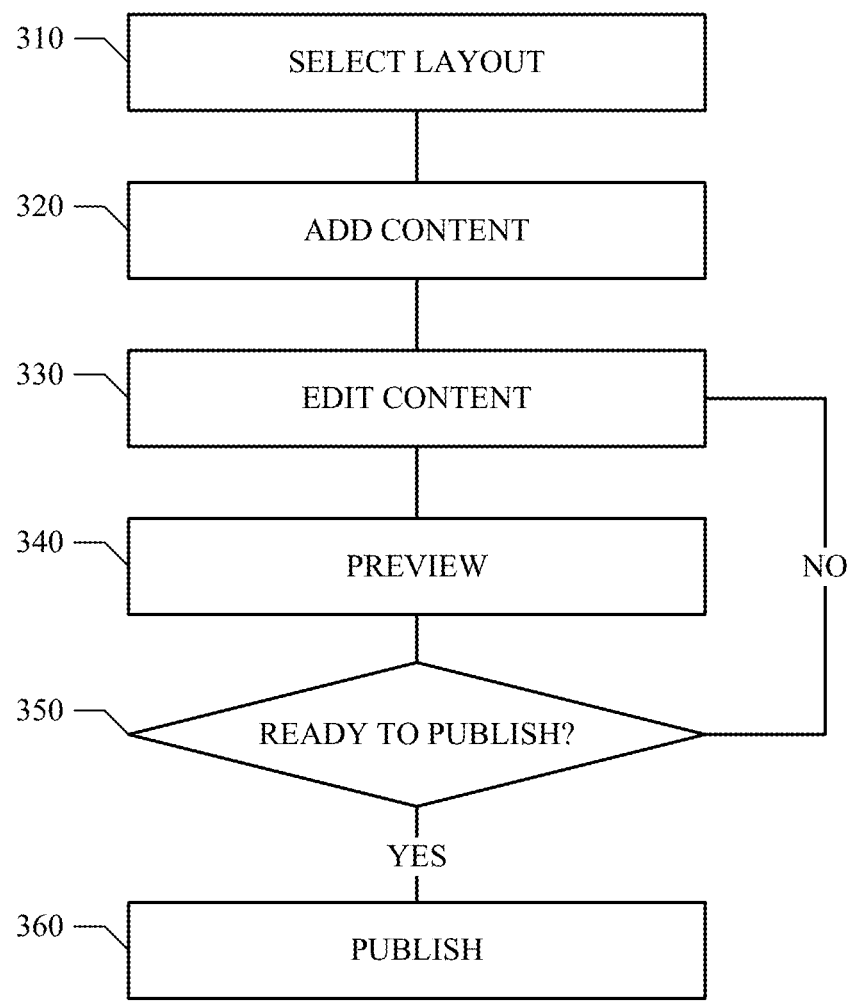
FIG. 3 illustrates an example method for editing each layer of a hierarchy.

Moreover, although this disclosure describes and illustrates particular steps of the methods of FIGS. 2 and 3 as occurring in a particular order, this disclosure contemplates any suitable steps of the methods of FIGS. 2 and 3 occurring in any suitable order. Furthermore, although this disclosure describes and illustrates particular components, devices, or systems carrying out particular steps of the methods of FIGS. 2 and 3, this disclosure contemplates any suitable combination of any suitable components, devices, or systems carrying out any suitable steps of the methods of FIGS. 2 and 3.

Figure 4:
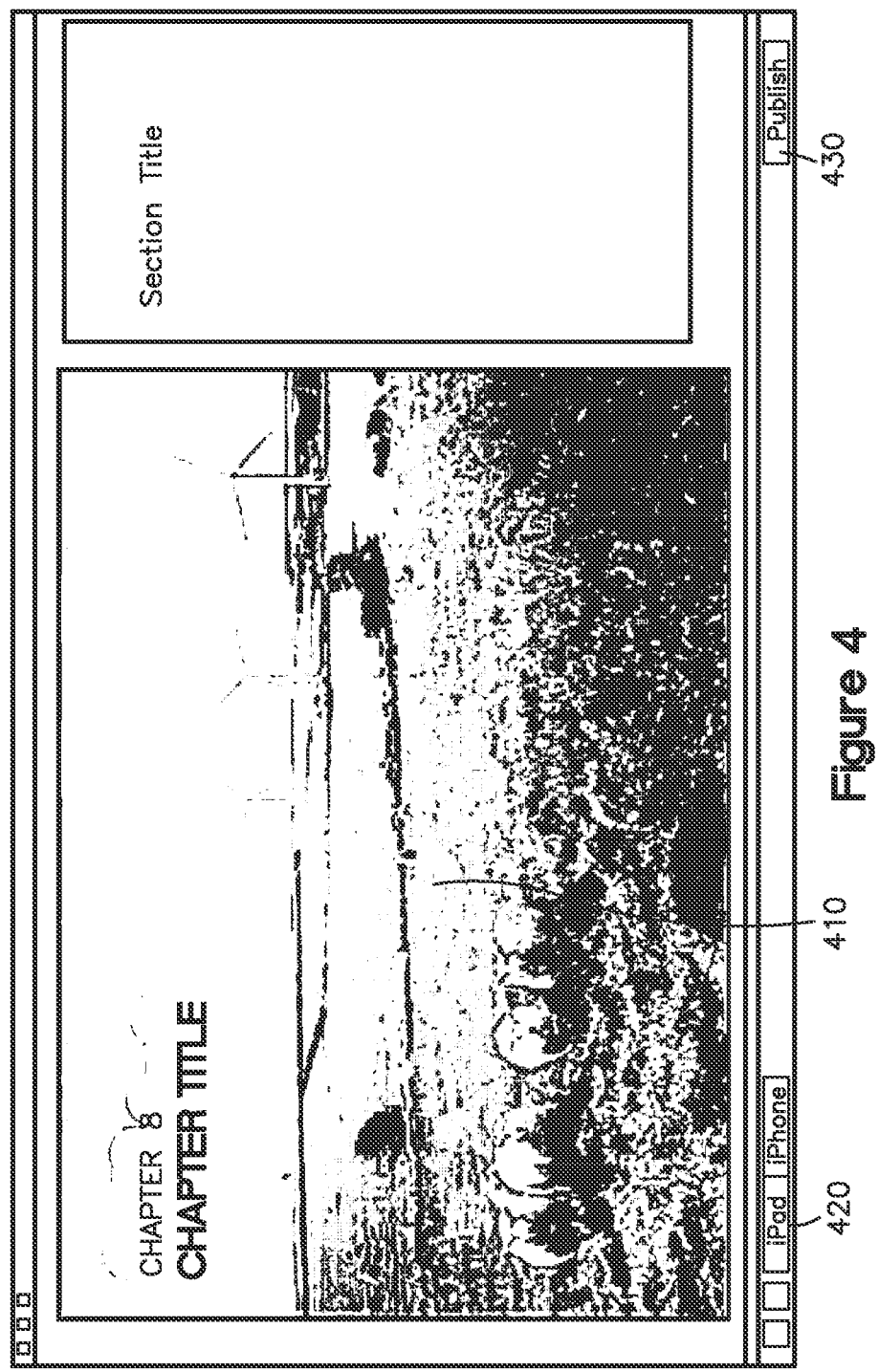
FIG. 4 illustrates an example layout in a user interface.

In particular embodiments, a designer may select from one or more pre-designed global layouts and page templates to further enhance the efficiency of creating content. For an object at any level of the hierarchy, the designer may select one of the pre-designed layouts and arrange the object's child objects according to the selected layout. As an example, a user interface, with its components, may be an interactive touch-drive digital book. FIG. 4 illustrates an example layout for an interactive touch-driven book, which may be suitable for use with a section or chapter of the book. More specifically, layout 410 shows an example chapter in the UI hierarchy, including the chapter title page that may include text and images, and section pages that follow, which may be edited to include text, images, video, audio, or interactive media. On the chapter title page, there may be a chapter number, chapter name, and background image associated with the chapter title page. The chapter title page represents one level in the hierarchy of objects. The section pages and the content within them represent additional levels within the hierarchy.

In particular embodiments, layouts may follow a hierarchical structure. For example, each layout may include multiple chapters or sections, and each section may comprise multiple pages. In particular embodiments, any hierarchical degree or structure may be defined by the layout. For example, each page may include multiple columns, or each column may include multiple paragraphs. This disclosure contemplates any suitable UI layout having any number of hierarchical or flat sub-elements. In particular embodiments, layouts may not necessarily follow a sequential or book reading flow. For example, particular layouts may be organized as a graph, each central concept represented by a parent object having child objects. In particular embodiments, each child object may be connected to multiple parent objects. This disclosure contemplates layouts of any suitable structure.

In particular embodiments, the designer may expand or collapse each hierarchical section independently through the user interface. For example, the layout may first display a sequential listing of chapters that the user may swipe through. In particular embodiments, the user can reverse-pinch or tap a particular chapter to expand all the pages for that chapter. Conversely, the user may pinch a page to collapse all the pages in that chapter under the chapter. This disclosure contemplates any suitable user interface and method of controlling a user interface to view a layout of any suitable structure.

As disclosed above, a particular layout may mimic the layout of a book. For example, each book may include multiple chapters/sections, each chapter/section comprising one or more pages. The user may advance through the pages by swiping on the touch interface from right to left, and reverse through the pages by swiping on the touch interface from left to right (or vice versa in Asian languages). In particular embodiments, each page may be divided into multiple regions. In particular embodiments, each page may be divided into a left region and a right region. In such embodiments, each page therefore is analogous to the view of a user with a physical book open, and the left region is analogous to the left page of a physical book, and the right region is analogous to the right page of a physical book. In particular embodiments, each page may be divided into four quadrants. This disclosure contemplates any suitable number of regions for each page.

Figure 13:
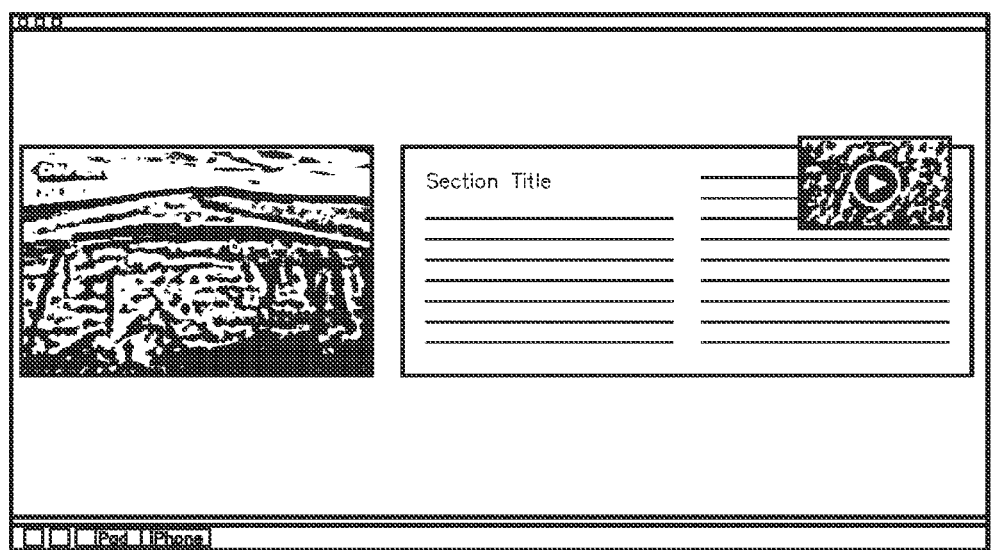
FIG. 13 illustrates an example user interface for a smartphone form factor.

In particular embodiments, the pre-designed layouts may be optimized or designed for particular devices or form factors. In particular embodiments, for example, a user may access a pre-designed layout optimized for the tablet form factor (e.g., the Apple® iPad® or Android® Tablet), an example of which is illustrated in FIG. 4 (e.g., button 420 for an "iPad" form factor). In other embodiments, for example, a user may access a pre-designed layout optimized for a smart-phone form factor (e.g., Apple® iPhone®), an example of which is illustrated in FIG. 13 (e.g., button 1310 for an "iPhone" form factor). This disclosure contemplates any suitable pre-designed content layout optimized or intended for viewing on any particular type of device.

In particular embodiments, each layout may include multiple modes, and each mode may be associated with a particular device. For example, a single layout may have two modes, one for an "iPhone" form factor and one for an "iPad" form factor. In particular embodiments, once content has been created in a particular form factor, such as "iPad" form factor, a user may switch to another form factor, such as "iPhone" form factor, and edit content that is already optimized for the previous (e.g., iPad) form factor so that the content is also optimized for the other form factor in addition to the previous form factor. In particular embodiments, the UI includes one or more buttons, such as button 420 in FIG. 4 and button 1310 in FIG. 13, for allowing a UI designer to quickly switch modes. The individual content objects within the layout may have a different set of characteristics for each mode. With some implementations, these sets of characteristics may be specified using metadata associated with the object. In other words, the metadata associated with an object may specify how the object should be presented for a specific mode or on a specific type of device. For example, a particular image may be placed in the top-right section in iPad mode, but the user may wish to make it a "top half" image in iPhone mode. Thus, when a particular mode is selected, object characteristics are saved for the particular mode. As a result, a UI designer may, for example, quickly lay out content objects in iPad design mode, and quickly tweak the layout for viewing on an iPhone. In particular embodiments, each mode has multiple sub-modes, such as portrait and landscape modes. This disclosure contemplates a user interface for designing a layout for any number of modes having any number of sub-modes. Again, there may be different sets of characteristics, specified using metadata associated with an object, for each sub-mode.

In particular embodiments, each page, and therefore, each region, may be populated by one or more objects. In particular embodiments, the objects may comprise text, static graphics, video, sound clips, interactive games, animations, and the like. Any element within a page may be classified as an object. Each object may occupy a region or portion of a region. For example, a UI designer may drag an image in the user interface that he or she wishes to place as an object into the layout for a current page.

Figure 5A:
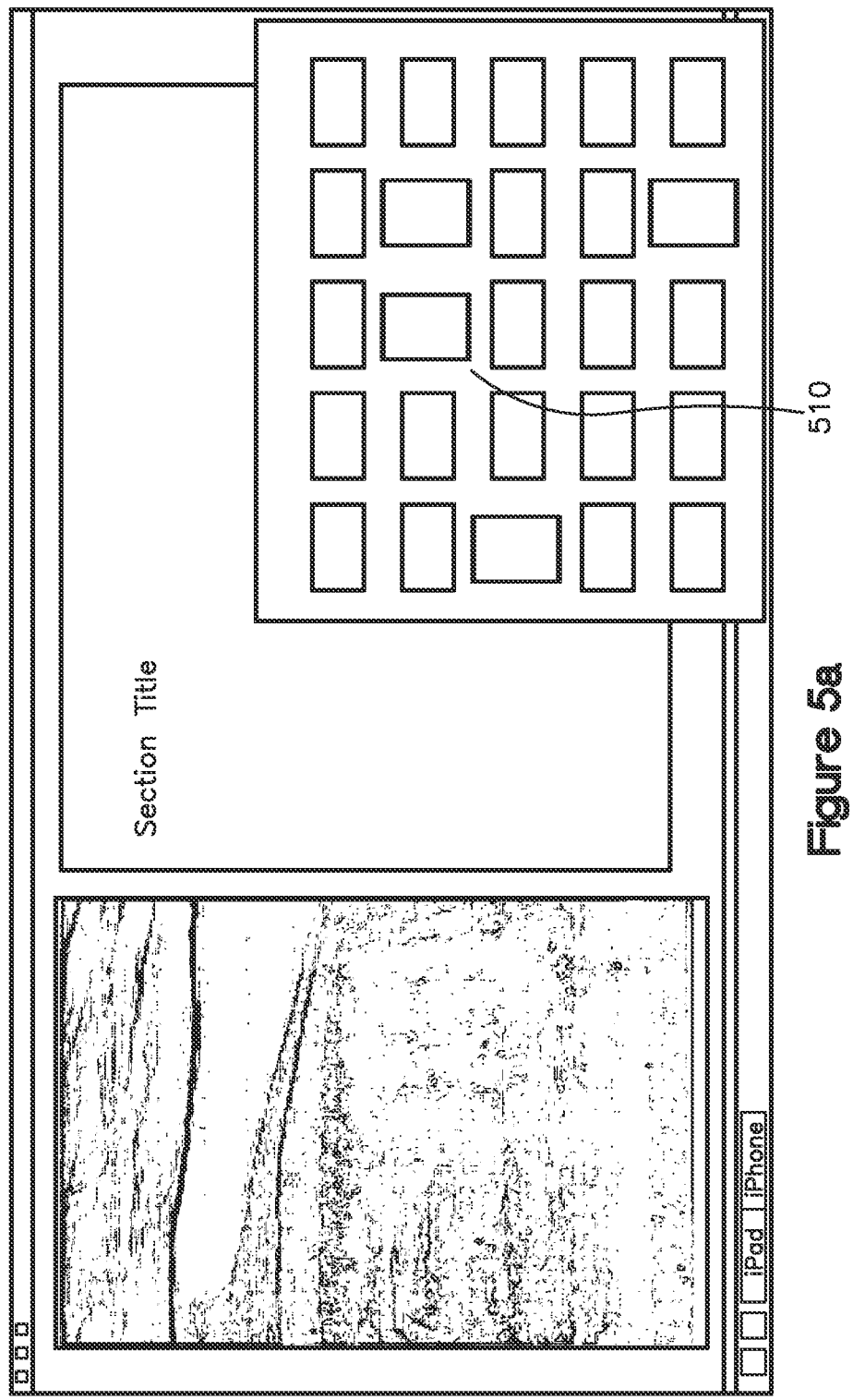
FIG. 5a illustrates an example menu for adding content to a user interface.

In particular embodiments, the UI editor supports a variety of object types. FIG. 5a illustrates a menu 510 that displays a variety of object types that are available as content. Objects, as discussed further below, are any piece of content that may be placed in a layout, such as a block of text, an image, a video, a graphic animation, or an interactive element such as a game. In particular embodiments, various file formats are supported such as MOV videos or Adobe Flash games. In particular embodiments, any HTML5 object may be imported into the layout. In particular embodiments, each object may be represented by the UI editor using a particular icon, such as the icons illustrated in menu 510. In particular embodiments, the icon may be a small representation of the object. In particular embodiments, the object may be zoomed for closer inspection by tapping or selecting the icon. In particular embodiments, the user may simply drag an object (e.g., from the file viewer on a user's computer) to the preview section to place the object in the current layout.

In particular embodiments, chapters are each a hierarchical structure comprising one or more pages. In particular embodiments, each chapter may have its own cover page. In such embodiments, the user may select an image object as the cover page and drag it to the preview section for the cover page. In particular embodiments, the user may enter text directly onto the preview section for the cover page to assign a name to the chapter or layout. In particular embodiments, the UI editor automatically justifies, or "snaps", entered text depending on the region it is placed. For example, if the user places text somewhere in the left region, it may be automatically left justified. Similarly, if the user places text anywhere in the right region, it may be automatically right justified. As another example, if the user places text roughly in the middle of the two regions, it may be automatically centered. This disclosure contemplates any suitable method of automatically justifying or aligning text.

Figure 5B:
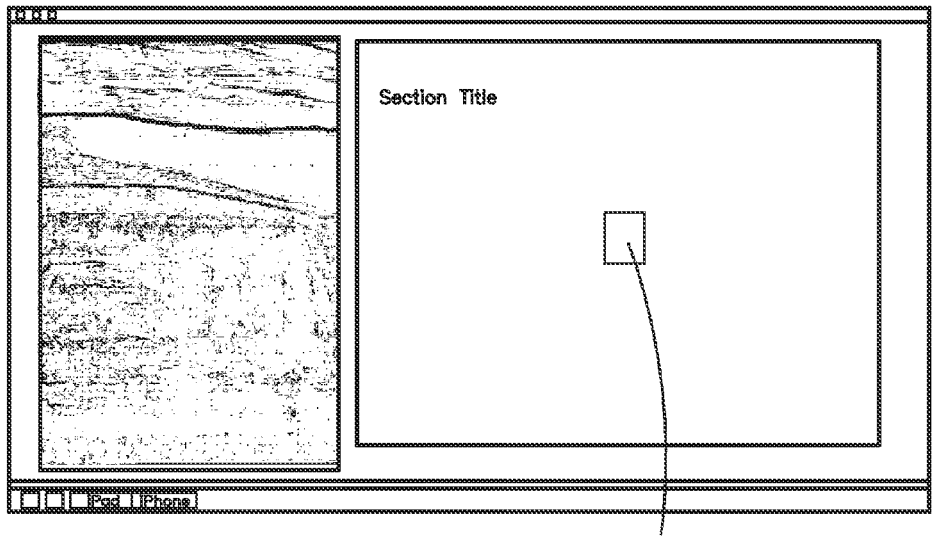
FIGS. 5b and 5c illustrate example content being added to a user interface.
Figure 5C:
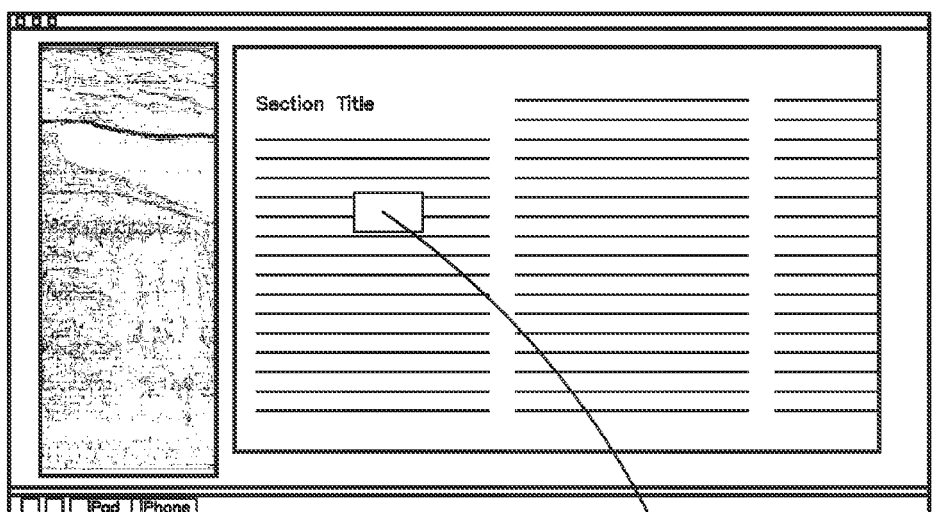

In particular embodiments, the UI designer may design pages simply by dragging objects to the desired page. FIGS. 5b and 5c illustrate a designer simply dragging various objects to the desired page. For example, the designer may drag a text document to the page, as illustrated by icon 512 being located within the section below the section title. In particular embodiments, the UI editor automatically breaks the document into a number of columns, and adds additional pages to hold the text of the document based on predefined factors such as font size, number of columns per page, number of columns per region, and the like. In particular embodiments, the UI editor includes a text menu which allows the designer to select some or all of a text object and alter its attributes, such as size, color, opacity, formatting, justification, style, shadows, special effects, and the like. In particular embodiments, text objects may include links (e.g., clickable hyperlinks) to other sections, pages, regions, or objects. In such embodiments, the text menu may include a field for the designer to enter a reference to another portion of the book, or to an internet address.

As another example, a UI designer may drag an image to the page, as illustrated by icon 514 being located with the left section of the text below the section title. A page may be divided into a left part, a right part, a top part, and a bottom part. Texts, images, videos, audios, or any combination thereof may be inserted into the page. In particular embodiments, an image or video may occupy ¼ of a page, ½ of a page, the full page, or any portion or size of the page. If an object occupies ¼ of a page, it may be positioned in the top-left quarter, top-right quarter, bottom-left quarter, or bottom-right quarter of the page. If it occupies ½ of a page, it may be position in the top half, bottom half, left half, or right half of the page.

Figure 7:
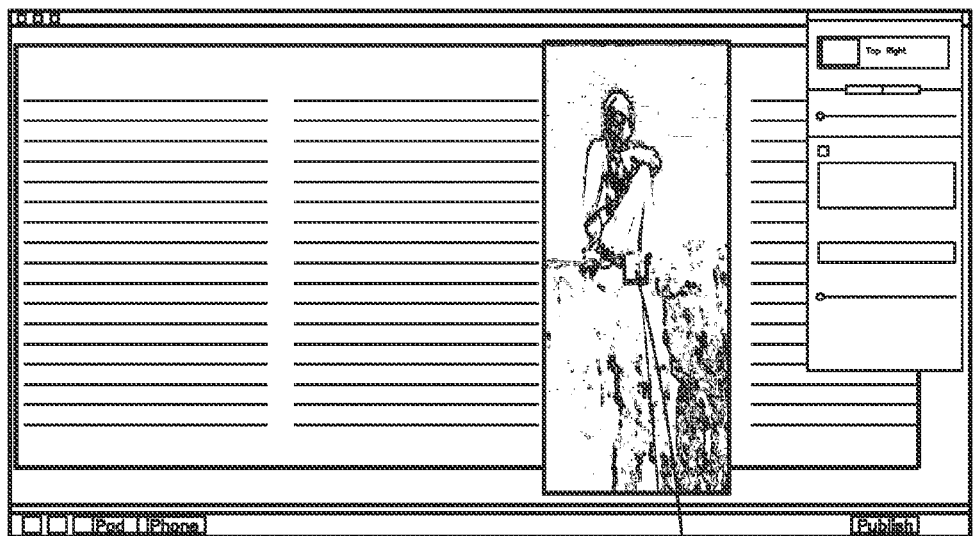
FIG. 7 illustrates an example icon for displaying an image in an example page of a user interface.

In particular embodiments, there is some level of intelligent design logic involved, to achieve a pleasing appearance for the page as well as to meet the designer's intent in positioning the objects in each page. As an example, an image may include a caption or a title. When the image is positioned on the left side of a page, the caption included in the image may be automatically aligned left. When the image is positioned on the right side of a page, the caption included in the image may be automatically aligned right. When the image is positioned in the center of a page, the caption included in the image may be automatically aligned center. As another example, an image may be associated with a geographic location tag. There may be a default location for placing the geographic location tag. For example, by default, the icon representing such a tag may be placed in the lower right corner of the image. However, if the user chooses to place a caption at or near the lower right corner of the image, the icon representing the geographic location tag may be automatically moved to another suitable location (e.g., the lower left corner of the image). As a third example, a caption (e.g., text) may be placed on top of an image. When placing the caption on an image, the color of the caption text may be adjusted automatically depending on where on the image the caption is placed. If the caption is placed on a portion of the image where the pixel colors are relatively dark, the color of the caption text may be in a lighter color. Conversely, if the caption is placed on a portion of the image where the pixel colors are relatively light, the color of the caption text may be in a darker color. In other words, the color of the caption text may be automatically selected to be a color that is contrast to the pixel colors of the portion of image where the caption is placed. The designer has the option of manually changing the color of the caption as desired. In some cases, the portion of the image overplayed by the caption text may be slightly dimmed so that the caption text is more readable. Similarly, the size or position of the caption text may be automatically adjusted so that it is easier to read. In some cases, when an image is pinched down to a smaller size, the caption text included in the image may remain at a larger size so that it is more readable. As a fourth example, when an image is associated with a title, the title of the image stays with the associated image so that the image and its title are always on the same page. If, during editing, some content is inserted before an image, causing the image to move down to another page, its title always moves down to the subsequent page with the image. In FIG. 7, for example, an image is placed on the right half of a page and is folded vertically in the middle. An icon 710 enables a designer to choose which half of the image is shown when the image is displayed on the page.

Figure 10:
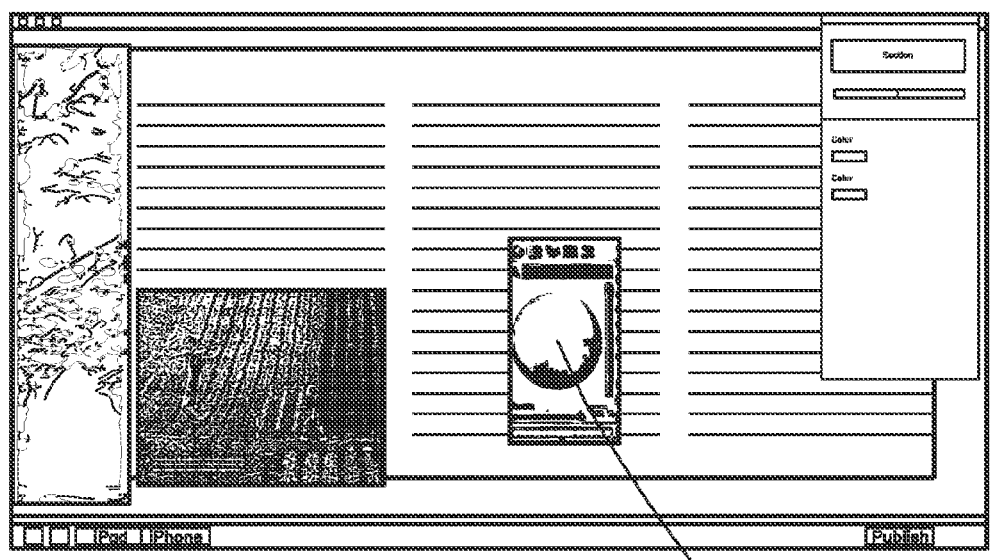
FIG. 10 illustrates an example color wheel for editing the coloration of text.
Figure 11:
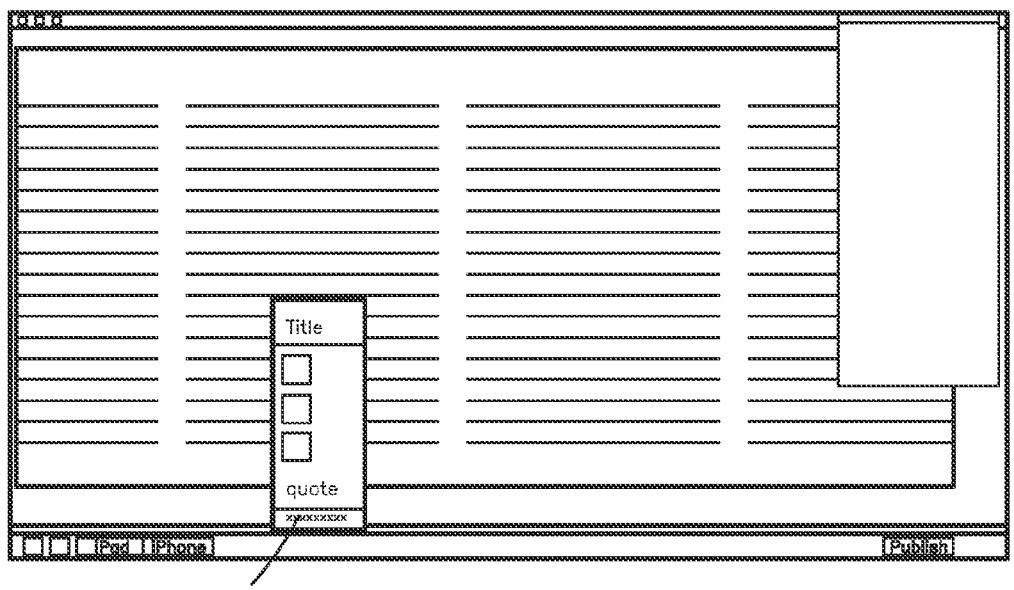
FIG. 11 illustrates an example menu for changing the appearance of highlighted text.
Figure 12:
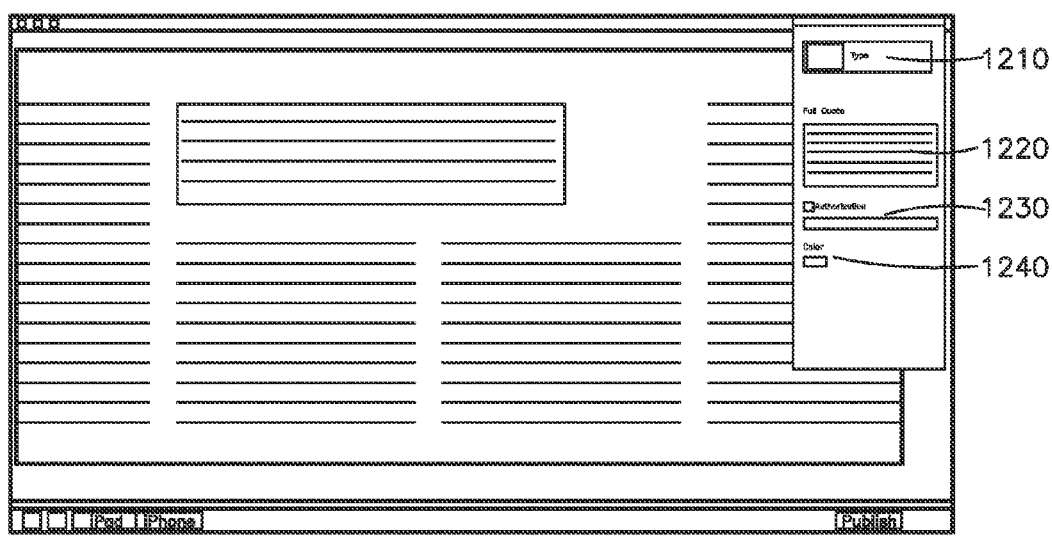
FIG. 12 illustrates an example menu for editing a block quote.

FIG. 10 illustrates a menu that enables a UI designer to manually adjust the color of any text (e.g., using color wheel 1010). In particular embodiments, the text menu may include options to transform highlighted text into titles, subtitles, or quotes. In such embodiments, a designer may simply highlight text in a text object using an input device, and click the desired type in the text menu. FIG. 11 illustrates an example UI editor interface that provides the designer with a menu of one or more options for the highlighted text. In particular embodiments, using menu 1110, the UI designer may create a title, insert a picture, movie, or other interactive image, or transform the highlighted text into a quote. In particular embodiments, the style of each type of text may be predetermined. For example, text of the style "quote" may be at a different font size, justification, and color. In particular embodiments, any property of text may be modified for any particular style. In particular embodiments, the UI designer may designate these styles using a markup language, such as cascading style sheets. In particular embodiments, each text style may have a sub-menu with one or more options. For example, selecting the "quote" style may cause the UI editor to pop-up a sub menu having a number of options. The UI designer may choose any one of these options as needed. As an example, the attribution may be placed at the "top" (above the transformed text) or the "bottom" (below the transformed text) based on the UI designer's selection of a "top" or "bottom" radio button. FIG. 12 illustrates an example UI editor interface that provides the UI designer with a sub-menu of one or more options. In particular embodiments, the sub-menu provides a series of buttons with one or more options for the text. In particular embodiments, for example, button 1210 allows the UI designer to orient the text box to various locations on the page, such as upper left, lower left, lower right, upper right, top half, bottom half, left half, or right half. Buttons 1220, 1230, and 1240 allow the UI designer to edit the text box itself. For example, the UI designer may want to edit the quote within the text, and button 1220 allows the designer to edit the text. If the designer wants to add a citation or who is being quoted, the designer may select button 1230 and add a citation. The UI designer may want to change the color of the text, and may use button 1240 to change the color of the text from black to blue, as an example.

In particular embodiments, text objects may be overlaid on top of other objects, such as a background image. In such embodiments, the UI editor may automatically adjust the color or brightness of either the text or the background image when it determines that the overlaid text is too difficult to read. For example, the image may be dimmed in the area in which the text overlaps it. In other implementations, the text may be adjusted to have a higher contrast ratio with the underlay image. In particular embodiments, the UI designer may drag a text box to various regions of the preview area, and the text box may automatically snap to certain alignment or adjust its shape, justification, sizing, and shading. In particular embodiments, when positioning a caption on an image, the placement of the caption may determine various characteristics of the caption, such as the size, color, style, etc. This disclosure contemplates any suitable method of adjusting text characteristics based on its positioning.

Figure 6:
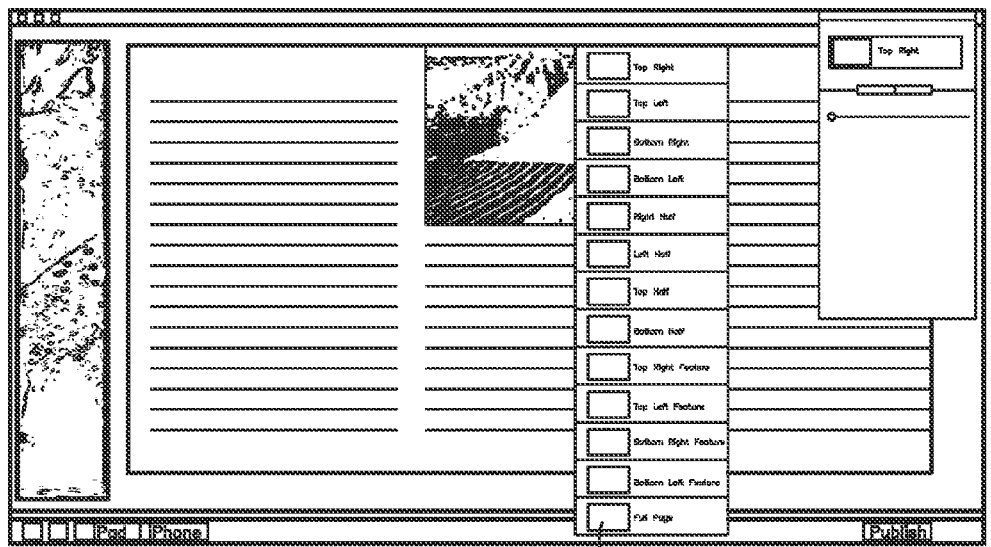
FIG. 6 illustrates an example menu for locating content in an example page of a user interface.

In particular embodiments, the UI designer may define the size of the object. For example, if the designer wishes for an image to take up a full page, half page, or some other dimension, the designer may, after dragging the image object to the page, adjust the orientation and size of the image object by touching the two corners of the image object, positioning it, and performing a pinch (to decrease the size of the object) or reverse pinch/zoom (to increase the size of the object) on a multi-touch I/O device. Alternatively, these operations may also be performed with a mouse or stylus. In particular embodiments, the UI designer may select from one or more pre-defined regions to place a particular object. For example, the designer may drag and drop an image object from the library to a particular page, and then right-click (or touch-hold) to access a placement menu for the image object. In particular embodiments, the placement menu may have pre-defined positions such as "top left", "top right", "bottom left," or "bottom right" for the placement of the object. In particular embodiments, the placement menu may allow the designing to place an object so that it takes up the entire left region or right region, by selecting options for "left half" and "right half." The placement menu may allow the designing to place an object so that it takes up the entire top half of a page or bottom half of a page, by selecting options for "top half" and "bottom half." In particular embodiments, the placement menu may include options for "feature" placement, which may include the size of the object image for greater visibility. Thus, in particular embodiments, the placement menu may include the following options: top right, top left, bottom right, bottom left, right half, left half, bottom half, top half, top right feature, top left feature, bottom right feature, bottom left feature, and full page. This disclosure contemplates any suitable method of placing, sizing, or rotating an object in the page. FIG. 6 illustrates an example interface of UI editor that displays a placement menu 610. Placement menu 610 allows a UI designer to define the size of the object and place it on a page by selecting a predefined size and position option. For example, menu 610 includes a number of predefined feature placement templates showing that images may be of various sizes on a page and placed at various positions on a page. A UI designer may choose any one of the templates by selecting it from the menu even after the object has already been placed on the page.

Figure 8A:
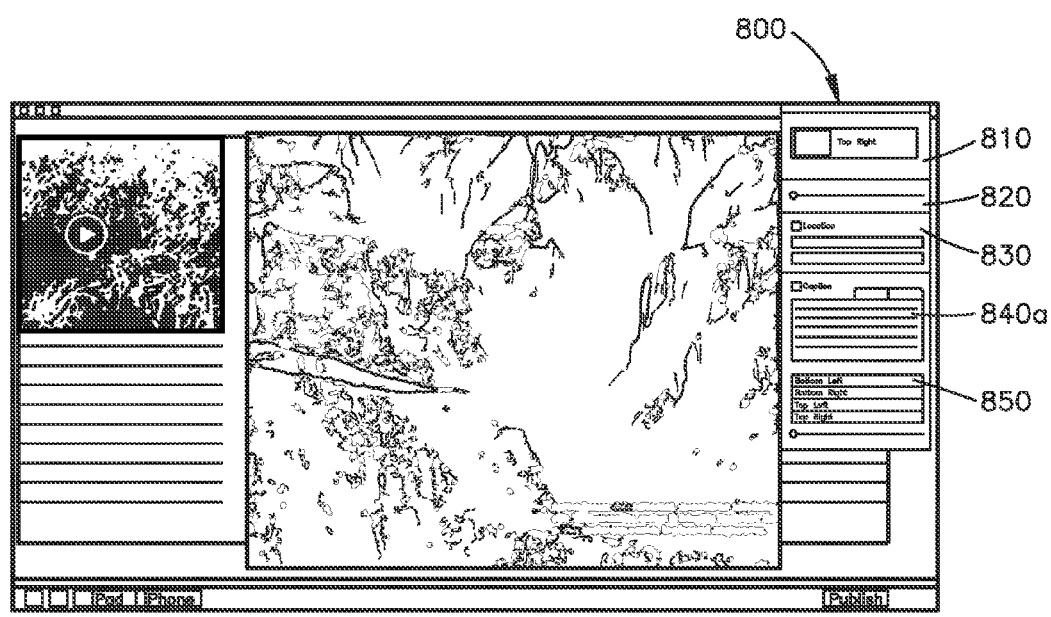
FIG. 8a illustrates an example menu for editing content.

FIG. 8a illustrates an example interface of UI editor that displays a menu that permits the UI designer to designate multiple characteristics of each state of a particular object. In particular embodiments, the UI editor's interface may include one or more buttons that define other elements that may be in each of the states of an object. Placement menu 610 may also be access via menu 800 of FIG. 8a and button 810.

In particular embodiments, the UI editor allows a UI designer to crop or zoom objects for any particular state. Button 820 may allow a designer to crop or zoom objects for any particular state. For example, the designer may drop an image object into a page, and designate that the image occupy ¼ of the screen, such as the bottom left quadrant. A high-detail image reduced to 25% of its full-screen display size may be difficult to see, and therefore of limited use to a viewing user. Thus, the designer may, either by right-clicking (or touch-holding) or via a dedicated sub-menu, designate that the image object in the "view" state (i.e., without being selected) may be a 100% crop, or a portion of the full-resolution object, of the full-screen image object, rather than a reduced-size version of the entire image object. As an example, if a UI designer decides to place an image having a resolution of 1600×1200px into a 640×480px area, the image may be too small and grainy for useful viewing. Thus, the designer may choose to select a 640×480 portion of the 1600×1200 image (for example, the center) to be placed in the page area.

In particular embodiments, pre-defined 100% crops may be accessed for any state. For example, if a UI designer wishes to place a full-screen image only in the right region of a page by selecting "right half" in the placement menu, the designer may choose, via clicking the object, which half of the image is displayed during the view, or unselected, state. For example, the UI editor may default to displaying the left half of the image, and the designer may toggle the UI editor to display the right half of the image in the view state simply by clicking the image object. In particular embodiments, selecting the image object pops up another sub-menu that displays a visual representation of the whole image, with the section to be displayed highlighted and the section not to be displayed greyed-out. The designer may select the section to be displayed via this sub-menu. In particular embodiments, the sub-menu may be accessed simply by mousing-over the image object.

Figure 9:
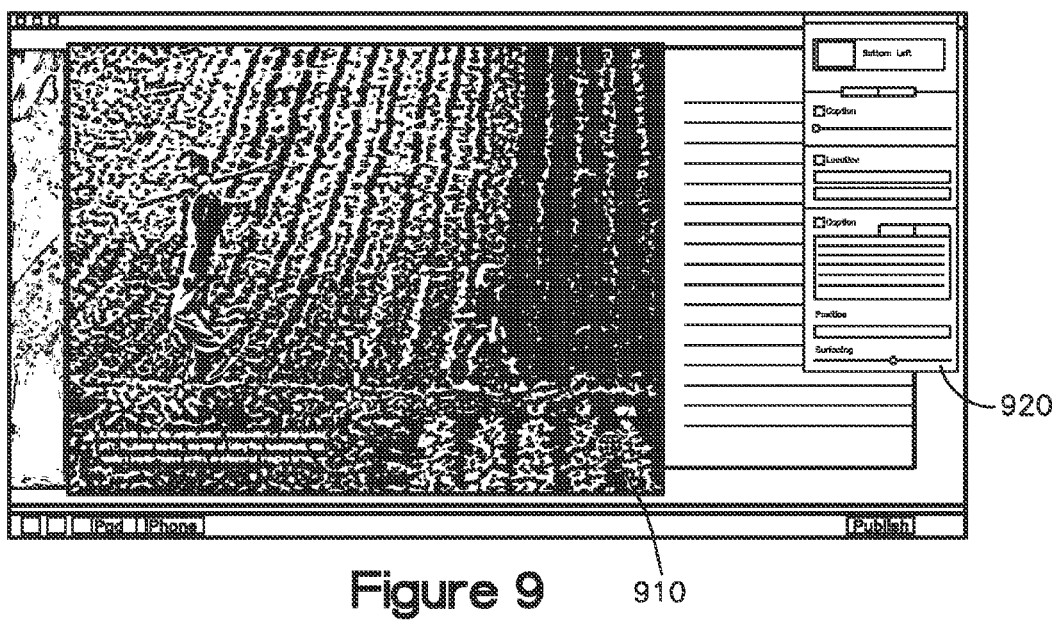
FIG. 9 illustrates an example menu for attaching a geo-tag to an image.

Button 830 on menu 800 provides the UI designer the option to add a location icon to the object. In particular embodiments, when the UI designer opts to include a location button to a state of the object (in this example, the "selected" state), the UI editor's interface prompts the designer to fill out a longitude and latitude coordinate pair, zip code, or city associated with the object. FIG. 9 illustrates a displayed menu 920 that enables the UI designer to attach an icon 910 representing a geo-tag to an image and entire location information associated with the geo-tag. In particular embodiments, such location information may be derived automatically from metadata associated with the object (e.g., EXIF data associated with an image). When a viewing user, who reads the book, selects the location button, the book may launch a mapping application that displays a world map with a pin or other visual indication of the location specified by the UI designer and associated with the object. For example, if the UI designer inserts a picture of the Eiffel Tower, enables the location button for the object's selected state, and enters "Paris, France" for the location, when a viewing user selects the location button, he or she will see a map of the world with a pin on "Paris, France." In particular embodiments, the map also includes an indication of the viewing user's own location. In particular embodiments, this location may be ascertained from the GPS (Global Positioning System) receiver of the viewing device. In particular embodiments, it may be determined via time-distance of arrival from a cellular network provider. In particular embodiments, it may be inferred based on the user's actions on a social networking system. This disclosure contemplates any suitable method of obtaining the viewing user's location for display on a map after the "location" button for an object has been selected.

In particular embodiments, instead of styling individual pages, the objects are styled. An object (e.g., an image or video) may be anchored in elements of texts. For example, an anchor may be associated with a portion of the text, referring to an object (e.g., the text may say "see FIG. 3', which becomes an anchor associated with a figure). The anchored figure is then added. The anchor and the reference object are guaranteed to be on the same page always.

Figure 8B:
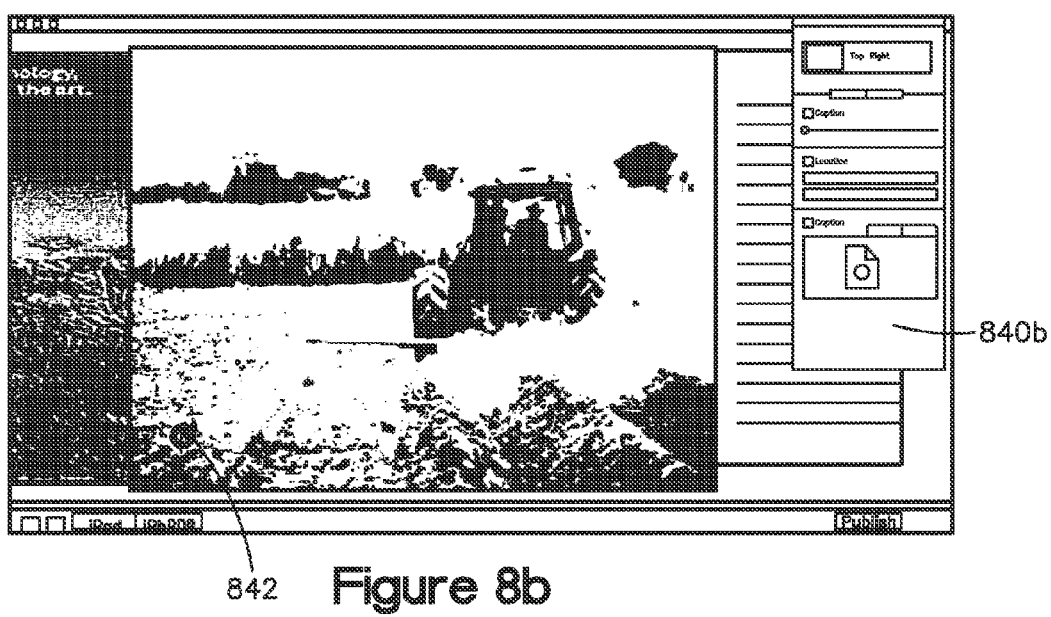
FIG. 8b illustrates an example menu for adding an additional layer of content to an object.

In particular embodiments, the UI editor's interface may permit nested objects. Button 840a provides the UI designer the option to add text or other sub-objects to the current object. In particular embodiments, the nested objects may be of different types. For example, if the UI designer wishes for an image to play an audio file in a particular state, the designer may access the menu for that state, and drop in an audio object. In particular embodiments, the menu for the particular object/state combination includes an "audio" field in which the designer may drag an audio file into. FIG. 8b illustrates an example menu where the UI designer may insert an audio file into a particular object/state combination. The menu provides a button 840b that permits the UI designer to select the particular audio file to insert. Once a particular audio file is selected, a corresponding icon 842 attaches to the image with which the audio file is associated. In either embodiment, when a viewing user accesses the particular object and particular state (for example, by selecting an image object), the nested audio object may begin playback. In particular embodiments, the UI editor's interface includes menus for inserting audio playback controls for the nested audio object into the designated object/state combination. This disclosure contemplates any suitable nesting of objects.

In particular embodiments, the UI editor's interface permits the UI designer to designate multiple characteristics of each state of a particular object. As discussed above, FIG. 7 shows an example image that is folded vertically in the middle and placed so that the right half of the image is displayed on the right half of a page. Icon 710 enables the designer to choose which half of the image is shown when the image is displayed on the page, and even though the image is a single object, the designer user may designate multiple characteristics for each half of the image, or designate multiple characteristics for each state of the image. For example, the UI designer may access a separate menu in the UI editor's interface by clicking a particular button on the UI editor's interface or right clicking (or touch-holding) on the object.

As discussed with reference to a menu in FIG. 8a, there may be separate menus for each state of the image that permits the UI designer to designate separate characteristics for each state of the image. Like the menu described with reference to FIG. 8a, the separate menu may include radio buttons or menus that allow the UI designer to define the appearance of the object in its first and second states. For example, the UI designer may choose that an image, when selected by a viewing user, take up an entire page, half a page, a quarter of the page, or the like. In particular embodiments, the caption for each state may be different; i.e., the UI editor's interface may provide a separate text box for the caption for an object in the first state, and a separate text box for the caption for an object in the second state. Similarly, the separate menu may provide the UI designer control as to the placement of the caption in the first and second states; the UI designer may choose for the caption to be on the bottom left for an unselected object, and the top right for a selected object.

In particular embodiments, a UI designer may define multiple states for an object. For example, the UI designer may define a first state for an object when the object is not selected, and second state for the object when it is selected or interacted with. In particular embodiments, the UI designer may design any number of states for an object. In particular embodiments, multi-state objects are placed with their upper or lower border extending beyond the text of the page. In particular embodiments, certain objects are by default multi-state objects. For example, it is annoying for video to begin playing automatically when a user views a page; rather, it is a more pleasant and unrushed viewing experience when a user may play and pause video objects at their leisure. Thus, video objects may be two-stage objects by default, and when a UI designer drags a video object to the preview section, it may automatically be placed with its upper or lower edge extending beyond the first or last line of text, respectively.

In particular embodiments, the UI designer may define how each of the object states may be accessed. For example, the default object state may be a static image or video, and the second object state may be a "selected" state when the user clicks or selects the object. However, the UI designer may designate a third state that may be accessed only when the viewing user reverse-pinches (zooms) on the object. This may be advantageous for in-line video viewing. For example, the UI designer may drag a video object and drop it onto a particular page. In the first state, the video object is merely a single frame of the video object. When selected via a single tap or touch, the second state may be a "play inline" state, where the dimensions of the video object do not change during playback. The UI designer may further designate a "play full screen" state that may be accessed, for example, by double-tapping/clicking the video object or reverse-pinching (zooming) on the object.

In particular embodiments, the UI editor may allow the UI designer to include different user controls for each state. For example, the UI designer may drop a particular video file to a page, and define three states, a viewing state, a "play inline" state, and a "play full screen" state as described above. In particular embodiments, the sub-menus for each state may include options for inserting different types of user controls into each state. For example, in particular embodiments, the UI designer may designate what video playback controls to include in the "play inline" and "play full screen" states. For example, because of the small size of the object in the "play inline" state, the UI designer may choose to only insert a "pause/play" button. However, in the "play full screen" state, the UI designer may choose to include a timeline control, that allows the viewing user to scrub through the video or jump to a particular section. In particular embodiments, the timeline control is automatically scaled by the UI editor to occupy the entire width of the object, regardless of the object dimensions for the state. This disclosure contemplates any suitable method of permitting a UI designer to designate the inclusion, appearance, and behavior of various elements within an object for each object state.

In particular embodiments, the page or object layout process consists of two passes. During the first pass, the content flow is determined. For example, given a particular page, where should some text blocks be placed, where should an embedded object (e.g., image, video) be placed, whether the embedded object should take ¼ page, ½ page, or the whole page, whether an image should show a folded or cropped version in on-page view, whether an anchor point is attached to an embedded object and if so, where is the anchor point? If an object has an anchor point, the anchor point indicates the position of the object in the text stream. During the second pass, for each object (e.g., image, video) embedded in the page, the anchor points associated with the embedded object, if any, as well as desired styling information are cross referenced with the set of page layout templates valid for the current electronic device for which the layout is done. Each embedded object is snapped to pre-defined, designer approved layouts. The distance between an anchor point and its associated object (e.g., image) is minimized. In addition, some applicable heuristics (e.g., always keeping the anchor point and its object on the same page) are applied. In such process, the object, instead of pages, are styled. Objects are anchored into elements of text. An object has metadata that travels with it. The metadata inform the styling of the object relative to the page template or format in which the object is placed or used.

The UI editor may include a preview section that includes all the pages of the current layout in sequential order. In particular embodiments, the UI designer may scrub through the preview section by dragging a horizontal scroll bar (e.g., similar to the TOC area of the reader UI). In particular embodiments, the UI designer may scrub through the preview section using a vertical scroll bar. In particular embodiments, the UI designer may advance through the layout by clicking, tapping, or sliding. This disclosure contemplates any suitable method of advancing through a layout.

In particular embodiments, the UI editor allows the UI designer to insert text, graphics, objects, or files directly onto the preview section. For example, the UI designer may create a new page (e.g., a cover page) and type text directly onto the preview section of the UI editor's interface for the cover page. This disclosure contemplates any suitable tools for entering text, drawings, or images onto the preview section of a particular layout.

In particular embodiments, the UI editor includes a "publish" button (see e.g., button 430 of FIG. 4) that, when selected, compiles the layout into a format that may be viewed by a viewing device. In particular embodiments, compiled layouts are compiled in accordance with the current layout mode. In particular embodiments, compiled layouts are un-editable by other devices. In particular embodiments, the UI editor's interface includes an option to publish the layout to an application store or bookstore for other users to purchase and view.

In particular embodiments, the UI editor may utilize a schema. The schema indicates the visual presentation (e.g., format, layout, style, etc.) of the content. The UI editor supports a WYSIWYG (what you see is what you get) interface represented using the schema. As a UI designer designs a user interface, including its components, using the UI editor, what appears to the UI designer, in terms of, for example, the user interface's appearance, behavior, and functionality, is the same or similar to how the user interface shall appear to device users when it is published and presented on user devices.

In particular embodiments, an object (e.g., an image or video) may be associated with metadata. The metadata may describe, for example and without limitation, the object's layout, behavior, feature, and so on. If a user changes the format of a page, the UI editor may automatically generate a new layout of the objects on that page and the text around them based on the metadata associated with the objects.

Figure 14:
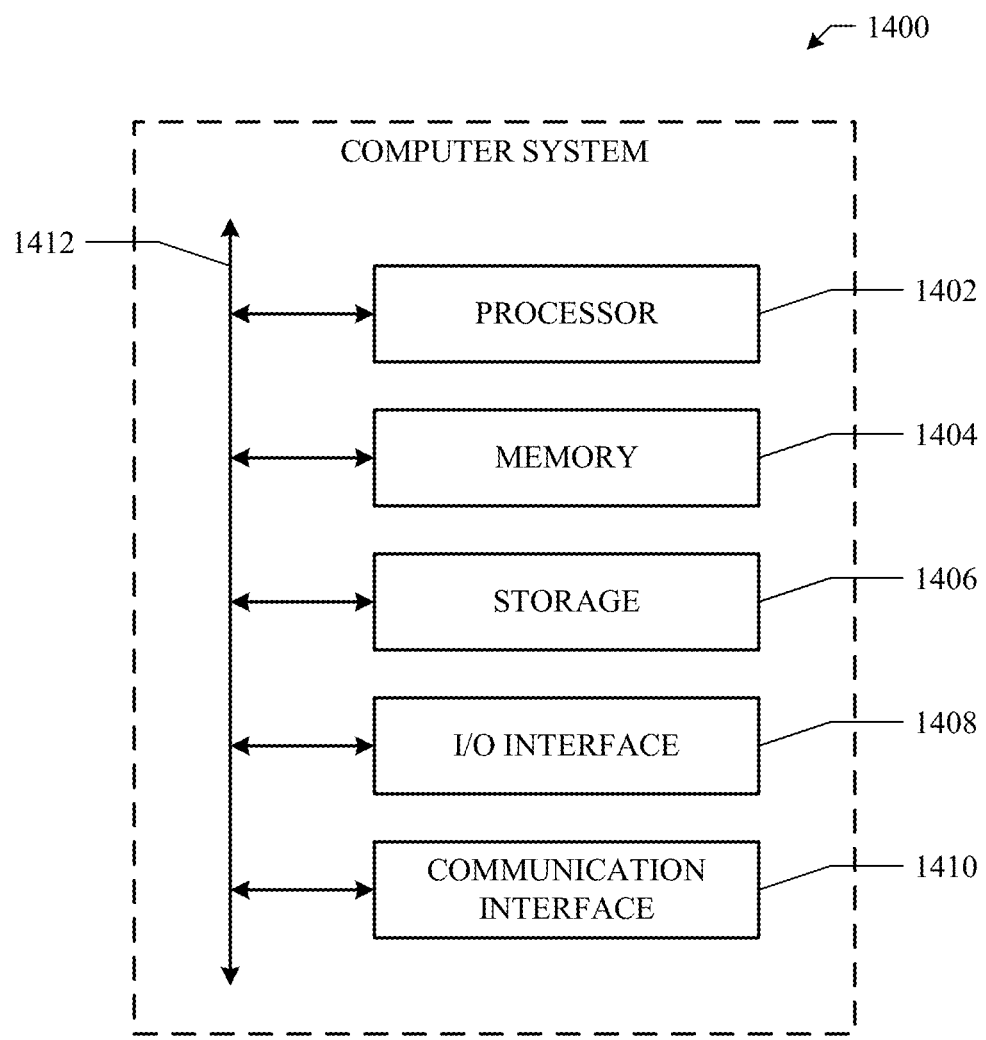
FIG. 14 illustrates an example computer system.

Particular embodiments may be implemented on one or more electronic devices or computer systems. FIG. 14 illustrates an example electronic device 1400. For example, computer system 1400 may be an embodiment for a device that runs a UI content editor. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1400 may include one or more computer systems 1400; be unitary or distributed; span multiple locations; span multiple machines; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory

1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include an HDD, a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, performed by one or more computing devices, comprising:
    defining a hierarchical structure for a user interface (UI) by a UI editor, comprising: receiving a first user input to define one or more layers of the hierarchical structure, adding one or more UI components at each layer, and specifying one or more relationships among particular UI components;
    associating metadata with each UI component at each layer, the metadata describing how the corresponding UI component is presented in the user interface;
    selecting a first layout from a plurality of layouts suitable for a plurality of types of devices, respectively, for displaying the one or more UI components;
    in response to receiving a second user input to modify at least one of the UI components of the first layout, modifying, by the UI editor, the UI component and the metadata associated with the UI component, wherein the modified metadata comprises information on the placement of the UI component associated with the first layout on the layer of the hierarchical structure;
    in response to receiving a third user input to switch from the first layout to a second layout different from the first layout, displaying the UI component in the second layout based on the metadata associated with the first layout; and
    in response to receiving a fourth user input to modify the UI component of the second layout, modifying, by the UI editor, the metadata to further comprise information on the placement of the UI component associated with the second layout on the layer of the hierarchical structure.

2. The method of claim 1, further comprising:
    selecting a layout for a first UI component;
    arranging one or more second UI components according to the selected layout, the second UI components being child UI components of the first UI component in the hierarchical structure; and
    adjusting a visual appearance of each of at least one of the second UI components.

3. The method of claim 2, wherein adjusting the visual appearance of a second UI component comprises
    automatically adjusting size, position, alignment zoom, field of view, or coloration of the second UI component based on visual characteristics of the first and second UI components.

4. The method of claim 1, further comprising:
    selecting the one or more layouts suitable for one or more types of devices, respectively, for a first UI component; and
    for each selected layout,
        arranging one or more second UI components according to the selected layout, the second UI components being child UI components of the first UI component in the hierarchical structure; and
        adjusting a visual appearance of each of at least one of the second UI components based on the type of device corresponding to the selected layout.

5. The method of claim 1, wherein the layout in the user interface is predefined or defined by a UI designer.

6. The method of claim 1, wherein the one or more UI components further comprise one or more of a text block, image, video, audio, feed, executable, website, web page, digital book, photo album, post, or message.

7. The method of claim 1, further comprising:
    generating one or more versions of the user interface for presentation by one or more types of devices, respectively, based on the metadata associated with each UI component at each layer of the hierarchical structure; and
    presenting the one or more versions of the user interface to a UI designer for previewing.

8. The method of claim 1, further comprising
    sending the user interface to a device for presentation to a user, the user interface being presented according to the hierarchical structure.

9. A system comprising:
    a memory comprising instructions executable by one or more processors; and
    the one or more processors coupled to the memory and operable to execute the instructions, the one or more processors being operable when executing the instructions to:
    define a hierarchical structure for a user interface (UI) by a UI editor, comprising: receiving a first user input to define one or more layers of the hierarchical structure, add one or more UI components at each layer and specify one or more relationships among particular UI components;
    associate metadata with each UI component at each layer, the metadata describing how the corresponding UI component is presented in the user interface;
    select a first layout from a plurality of layouts suitable for a plurality of types of devices, respectively, for displaying the one or more UI components;
    in response to receiving a second user input to modify at least one of the UI components, modify, by the UI editor, the UI component and the metadata associated with the UI component, wherein the modified metadata comprises information on the placement of the UI component associated with the first layout on the layer of the hierarchical structure;

in response to receiving a third user input to switch from the first layout to a second layout different from the first layout, display the UI component in the second layout based on the metadata associated with the first layout; and in response to receiving a fourth user input to modify the UI component of the second layout, modify, by the UI editor, the metadata to further comprise information on the placement of the UI component associated with the second layout on the layer of the hierarchical structure.

10. The system of claim 9, the one or more processors further operable to:

select a layout for a first UI component;

arrange one or more second UI components according to the selected layout, the second UI components being child UI components of the first UI component in the hierarchical structure; and adjust a visual appearance of each of at least one of the second UI components.

11. The system of claim 10, wherein adjust the visual appearance of a second UI component comprises automatically adjust size, position, alignment zoom, field of view, or coloration of the second UI component based on visual characteristics of the first and second UI components.

12. The system of claim 9, the one or more processors further operable to:

select the one or more layout suitable for one or more types of devices, respectively, for a first UI component; and for each selected layout, arrange one or more second UI components according to the selected layout, the second UI components being child UI components of the first UI component in the hierarchical structure; and adjust a visual appearance of each of at least one of the second UI components based on the type of device corresponding to the selected layout.

13. The system of claim 9, wherein the layout in the user interface is predefined or defined by a UI designer.

14. The system of claim 9, wherein the one or more UI components further comprise one or more of a text block, image, video, audio, feed, executable, website, web page, digital book, photo album, post, or message.

15. The system of claim 9, the one or more processors further operable to:

generate one or more versions of the user interface for presentation by one or more types of devices, respectively, based on the metadata associated with each UI component at each layer of the hierarchical structure; and present the one or more versions of the user interface to a UI designer for previewing.

16. The system of claim 9, the one or more processors further operable to:

send the user interface to a device for presentation to a user, the user interface being presented according to the hierarchical structure.

17. One or more computer-readable non-transitory storage media embodying logic that is operable when executed to:

define a hierarchical structure for a user interface (UI) by a UI editor, comprising: receiving a first user input to define one or more layers of the hierarchical structure, add one or more UI components at each layer and specify one or more relationships among particular UI components;

associate metadata with each UI component at each layer, the metadata describing how the corresponding UI component is presented in the user interface;

select a first layout from a plurality of layouts suitable for a plurality of types of devices, respectively, for displaying the one or more UI components;

in response to receiving a second user input to modify at least one of the UI components, modify, by the UI editor, the UI component and the metadata associated with the UI component, wherein the modified metadata comprises information on the placement of the UI component associated with the first layout on the layer of the hierarchical structure;

in response to receiving a third user input to switch from the first layout to a second layout different from the first layout, display the UI component in the second layout based on the metadata associated with the first layout; and in response to receiving a fourth user input to modify the UI component of the second layout, modify, by the UI editor, the metadata to further comprise information on the placement of the UI component associated with the second layout on the layer of the hierarchical structure.

18. The media of claim 17, further operable to:

select a layout for a first UI component;

arrange one or more second UI components according to the selected layout, the second UI components being child UI components of the first UI component in the hierarchical structure; and adjust a visual appearance of each of at least one of the second UI components.

19. The media of claim 18, wherein adjust the visual appearance of a second UI component comprises automatically adjust size, position, alignment zoom, field of view, or coloration of the second UI component based on visual characteristics of the first and second UI components.

20. The media of claim 17, further operable to:

select the one or more layout suitable for one or more types of devices, respectively, for a first UI component; and for each selected layout, arrange one or more second UI components according to the selected layout, the second UI components being child components of the first UI component in the hierarchical structure; and adjust a visual appearance of each of at least one of the second UI components based on the type of device corresponding to the selected layout.

* * * * *